US010759950B2

(12) United States Patent
Webster et al.

(10) Patent No.: US 10,759,950 B2
(45) Date of Patent: Sep. 1, 2020

(54) NON-ISOCYANATE SILOXANE-MODIFIED GLYCIDYL CARBAMATE RESINS AND COATINGS CONTAINING THEM

(71) Applicant: NDSU RESEARCH FOUNDATION, Fargo, ND (US)

(72) Inventors: Dean C. Webster, Fargo, ND (US); Madhura Pade, Fargo, ND (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 76 days.

(21) Appl. No.: 16/076,395

(22) PCT Filed: Feb. 28, 2017

(86) PCT No.: PCT/US2017/019960
§ 371 (c)(1),
(2) Date: Aug. 8, 2018

(87) PCT Pub. No.: WO2017/151621
PCT Pub. Date: Sep. 8, 2017

(65) Prior Publication Data
US 2019/0119505 A1   Apr. 25, 2019

Related U.S. Application Data

(60) Provisional application No. 62/301,065, filed on Feb. 29, 2016, provisional application No. 62/464,015, filed on Feb. 27, 2017.

(51) Int. Cl.
| | |
|---|---|
| *C09D 5/16* | (2006.01) |
| *C09D 183/10* | (2006.01) |
| *C08G 77/455* | (2006.01) |
| *C08G 77/08* | (2006.01) |
| *C08G 77/388* | (2006.01) |
| *C09D 183/08* | (2006.01) |
| *C08G 77/00* | (2006.01) |

(52) U.S. Cl.
CPC ........... *C09D 5/1675* (2013.01); *C08G 77/08* (2013.01); *C08G 77/388* (2013.01); *C08G 77/455* (2013.01); *C09D 183/08* (2013.01); *C09D 183/10* (2013.01); *C08G 77/70* (2013.01); *C08G 2150/00* (2013.01)

(58) Field of Classification Search
CPC .. C09D 5/1675; C09D 183/08; C08G 77/388; C08G 77/70; C08G 77/08

USPC ......................................................... 524/860
See application file for complete search history.

(56) References Cited

U.S. PATENT DOCUMENTS

| | | | | |
|---|---|---|---|---|
| 4,684,538 | A * | 8/1987 | Klemarczyk | .......... C08G 18/61 427/515 |
| 5,994,479 | A | 11/1999 | Green et al. | |
| 7,989,074 | B2 * | 8/2011 | Webster | ............. C08G 18/4063 428/447 |
| 2007/0055016 | A1 * | 3/2007 | Niesten | ................ C08G 18/706 525/100 |
| 2009/0286901 | A1 | 11/2009 | Vijverberg et al. | |
| 2009/0306239 | A1 | 12/2009 | Mijolovic et al. | |
| 2010/0216951 | A1 * | 8/2010 | Webster | ............. C08F 283/006 525/452 |
| 2015/0099128 | A1 * | 4/2015 | Harkal | ................... C08G 18/10 428/423.1 |

OTHER PUBLICATIONS

Gelest "DMS-C21" Safety Data Sheet, Oct. 29, 2014. (Year: 2014).*
International Search Report and Written Opinion in International Application No. PCT/US2017/019960, dated May 26, 2017.
nternational Preliminary Report on Patentability in International Application No. PCT/US2017/019960, dated Sep. 13, 2018.
Gelest "DMS-C21 SDS" Oct. 29, 2014; retrieved from https://www.gelest.com/product/carbinol-hydroxyl-terminated-polydimethylsiloxane-110-140-cst>.

* cited by examiner

*Primary Examiner* — Hui H Chin
(74) *Attorney, Agent, or Firm* — J.A. Lindeman & Co. PLLC

(57) ABSTRACT

This invention relates to novel non-isocyanate siloxane-modified glycidol carbamate (GC) resins and coating compositions containing them. The non-isocyanate siloxane modified GC resins of the invention comprise the reaction product of at least one organic polyisocyanate, glycidol, and at least one bis(hydroxyl alkyl)-terminated polydimethylsiloxane. The coating compositions of the invention comprise at least one non-isocyanate siloxane modified GC resin of the invention and at least one curing agent. The invention also relates to methods of making the resins of the invention and coatings containing them. The invention also relates to a fouling-release (FR) coating system comprising the coating compositions of the invention and methods of applying said FR coating systems to substrates. The invention also relates to articles of manufacture comprising a coating composition of the invention and a method of making such articles.

20 Claims, 26 Drawing Sheets

NON-ISOCYANATE SILOXANE-MODIFIED GLYCIDYL CARBAMATE RESINS AND COATINGS CONTAINING THEM

CROSS-REFERENCE TO RELATED APPLICATIONS

This application claims priority to U.S. Provisional Application Nos. 62/301,065, filed Feb. 29, 2016, and 62/464,015, filed Feb. 27, 2017. The disclosure of these provisional applications are incorporated herein by reference.

STATEMENT OF U.S. GOVERNMENT SUPPORT

This invention was supported by the Department of the Navy Office of Naval Research under Grant number N00014-12-1-0482. The U.S. government has certain rights in the invention.

BACKGROUND OF THE INVENTION

Epoxy and polyurethane polymer systems are popularly used in a variety of applications like protective coatings, industrial coatings, composites, and adhesives. See, e.g., Edwards et al., *J. Coating. Tech. Res.* 2005, 2(7), 517-527; Harkal et al., *J. Coating. Tech. Res.* 2010, 7(5), 531-546. The presence of intermolecular bonds within the polyurethane matrix results in high mechanical strength, toughness, and abrasion and chemical resistance. See, e.g., Harkal et al., *J. Coating. Tech. Res.* 2010, 7(5), 531-546; Chattopadhyay et al., *Prog. Polym. Sci.* 2007, 32(3), 352-418. Epoxies exhibit a versatile and convenient crosslinking chemistry, wherein the oxirane rings undergo ring opening reaction with amines. See, e.g., Edwards et al., *Prog. Org. Coat.* 2006, 57(2), 128-139; Royappa et al., *J. Appl. Polym. Sci.* 2004, 91(2), 1344-1351. The rate of the curing reaction depends on the type of amine crosslinker and the relative stoichiometric ratio of amine to epoxy. The resultant coatings show excellent corrosion resistance and adhesion to substrates. Glycidyl carbamate (GC) functional resins combine the properties of polyurethanes with the convenience of epoxy-amine chemistry.

GC resins can be synthesized by the reaction of isocyanates with glycidol to form carbamate linkages (—CO—NH—). See, e.g., Edwards et al., *J. Coating. Tech. Res.* 2005, 2(7), 517-527; Edwards et al., *Prog. Org. Coat.* 2006, 57(2), 128-139; Chattopadhyay et al., *Prog. Org. Coat.* 2008, 63(4), 405-415; Chattopadhyay et al., *Prog. Org. Coat.* 2009, 64(2), 128-137; Harkal et al., *J. Coating. Tech. Res.* 2010, 7(5), 531-546; Harkal et al., *Progress in Organic Coatings* 2012, 73(1), 19-25; Chattopadhyay et al., *Prog. Org. Coat.* 2009, 66(1), 73-85; Harkal et al., *J. Coating. Tech. Res.* 2011, 8(6), 735-747. The resultant resin combines the strength and abrasion resistance of polyurethanes with convenient epoxy-amine crosslinking chemistry. A typical formulation with GC resin consists of the carbamate resin and an amine crosslinker. When cured, the resultant thermoset possesses excellent mechanical strength and chemical resistance, and can be easily altered depending on the application by changing the type and amount of amine crosslinker in the GC formulations. In the past, Webster et al. have studied viscosity modification of GC resins (see Harkal et al., *J. Coating. Tech. Res.* 2010, 7(5), 531-546), sol-gel modified systems (see Chattopadhyay et al., *Prog. Org. Coat.* 2008, 63(4), 405-415; Chattopadhyay et al., *Prog. Org. Coat.* 2009, 64(2), 128-137), and water dispersible resins (see Harkal et al., *J. Coating. Tech. Res.* 2011, 8(6), 735-747) containing polyethylene glycol. Although isocyanate is used to synthesize GC resins, absence of free isocyanates in the final coating formulation is expected to greatly reduce hazards associated with spraying unreacted isocyanates.

This invention shifts the focus onto synthesizing and formulating coatings for marine fouling-release (FR) applications. Biofouling is the undesirable attachment and colonization of aquatic organisms, like microalgae and barnacles, on submerged surfaces. See Callow et al., *Nat. Commun.* 2011, 2, 244; Yebra et al., *Prog. Org. Coat.* 2004, 50(2), 75-104. The process of biofouling can be commonly explained as formation of an organic conditioning layer, followed by accumulation of microorganisms, like bacteria and algal species, and finally attachment and growth of macrofoulants, like barnacles and mussels. See Yebra et al., *Prog. Org. Coat.* 2004, 50(2), 75-104; Magin et al., *Mater. Today* 2010, 13(4), 36-44. Common disadvantages of biofouling include increase in drag and, therefore, increase in fuel consumption, reduction in the speed of the vessel, and migration of aquatic species to non-native environments. See Callow et al., *Nat. Commun.* 2011, 2, 244; Schultz, Biofouling 2007, 23(5), 331-341; Sommer et al., *Biofouling* 2010, 26(8), 961-972. Furthermore, the economic impact of biofouling also cannot be ignored; combating biofouling can cost as high as a billion dollars annually. See Sommer et al., *Biofouling* 2010, 26(8), 961-972.

Two main technologies have been introduced to combat biofouling. Traditional antifouling (AF) coatings contained tin, copper, or organic biocides, which would leach out over time and completely prevent the attachment of organisms. See Sommer et al., *Biofouling* 2010, 26(8), 961-972. Although highly effective, the potentially toxic nature of the leachates has led to the replacement of AF coatings with "safer" FR coatings. See Callow et al., *Nat. Commun.* 2011, 2, 244; Sommer et al., *Biofouling* 2010, 26(8), 961-972. FR coatings allow attachment of organisms, but the weak bond can be easily broken by hydrodynamic forces. See Sommer et al., *J. Coating. Tech. Res.* 2011, 8(6), 661-670; Bodkhe et al., *J. Coating. Tech. Res.* 2012, 9(3), 235-249. Commercially available FR coatings are typically based on low modulus (soft) silicone elastomers, which lack the required mechanical strength and adhesion to the substrate, making them less viable in long-term applications. See Sommer et al., *J. Coating. Tech. Res.* 2011, 8(6), 661-670; Bodkhe et al., *J. Coating. Tech. Res.* 2012, 9(3), 235-249.

To overcome the short comings of the commercial FR coatings, Webster et al. developed a self-stratified siloxane-polyurethane (SiPU) coating system. See, e.g., Sommer et al., *J. Coating. Tech. Res.* 2011, 8(6), 661-670; Bodkhe et al., *J. Coating. Tech. Res.* 2012, 9(3), 235-249; Ekin et al., *J. Comb. Chem.* 2007, 9(1), 178-188; Ekin et al., *J. Coating. Tech. Res.* 2007, 4(4), 435-451; Majumdar et al., Thermoset Siloxane-Urethane Fouling Release Coatings. ACS Publications: 2007. A typical coating formulation with SiPU system comprises an isocyanate, a polyol, and a difunctional high MW siloxane (APT-PDMS). Upon curing, the siloxane component stratifies to form the outer low surface energy layer, while the PU matrix provides mechanical strength and improved adhesion to the substrate. But recent concerns regarding the presence of unreacted isocyanate groups in 2K coating formulations has necessitated further research to find "safer" alternatives to the PU matrix. GC resin technology shows potential to reduce the hazards of isocyanates in 2K coating formulations. Therefore, GC systems are potential substitutes to make self-stratified FR coatings.

SUMMARY OF THE INVENTION

This invention relates to novel non-isocyanate siloxane-modified GC resins and coating compositions containing them. The non-isocyanate siloxane modified GC resins of the invention comprise the reaction product of at least one organic polyisocyanate, glycidol, and at least one bis(hydroxyl alkyl)-terminated polydimethylsiloxane (PDMS). The coating compositions of the invention comprise at least one non-isocyanate siloxane modified GC resin of the invention and at least one curing agent. The invention also relates to a method of making a non-isocyanate siloxane modified GC resin of the invention comprising the reaction of at least one organic polyisocyanate, glycidol, and at least one bis(hydroxyl alkyl)-terminated PDMS. The invention also relates to a method of making a coating composition of the invention comprising the reaction of at least one non-isocyanate siloxane modified GC resin of the invention and at least one curing agent. The invention also relates to a fouling-release (FR) coating system comprising the coating compositions of the invention and methods of applying said FR coating systems to substrates. The invention also relates to an article of manufacture comprising a coating composition of the invention and a method of making such article.

Other features, objects, and advantages of the invention are apparent in the detailed description that follows. It should be understood, however, that the detailed description, while indicating preferred embodiments of the invention, are given by way of illustration only, not limitation. Various changes and modifications within the scope of the invention will become apparent to those skilled in the art.

DESCRIPTION OF THE INVENTION

Figure 1:
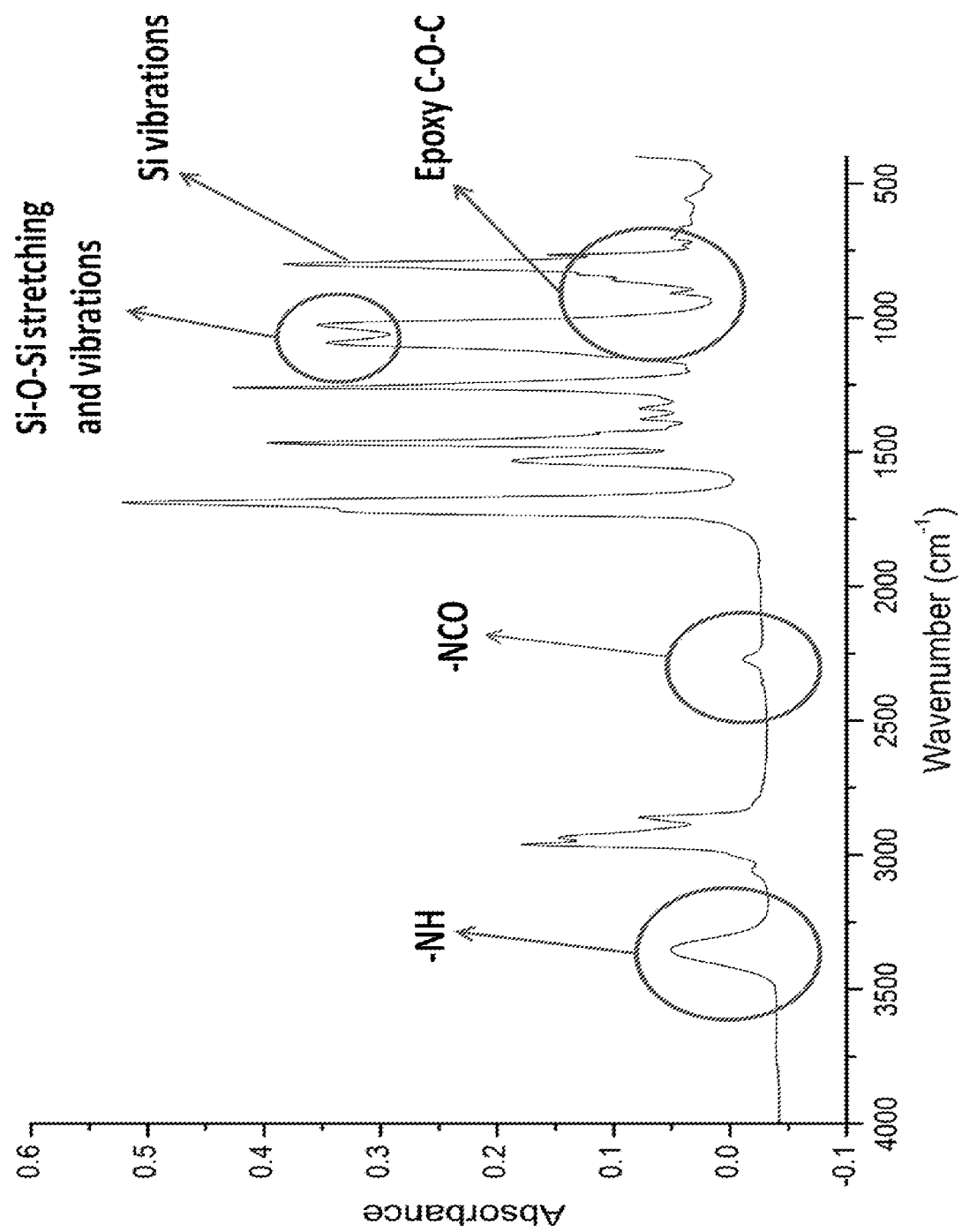
FIG. 1 shows a Fourier transform infrared spectroscopy (FTIR) scan for a siloxane-modified glycidyl carbamate resin of the invention.

The invention relates to novel non-isocyanate siloxane-modified GC resins and coating compositions containing them. The non-isocyanate siloxane modified GC resins of the invention comprise the reaction product of at least one organic polyisocyanate, glycidol, and at least one bis(hydroxyl alkyl)-terminated PDMS. The coating compositions of the invention comprise at least one non-isocyanate siloxane modified GC resin of the invention and at least one curing agent. The invention also relates to a method of making a non-isocyanate siloxane modified GC resin of the invention comprising the reaction of at least one organic polyisocyanate, glycidol, and at least one bis(hydroxyl alkyl)-terminated PDMS. The invention also relates to a method of making a coating composition of the invention comprising the reaction of at least one non-isocyanate siloxane modified GC resin of the invention and at least one curing agent. The invention also relates to a fouling-release (FR) coating system comprising the coating compositions of the invention and methods of applying said FR coating systems to substrates. The invention also relates to an article of manufacture comprising a coating composition of the invention and a method of making such article.

Non-Isocyanate Siloxane-Modified GC Resins

As discussed above, the invention relates to non-isocyanate siloxane-modified GC resins comprising the reaction product of at least one organic polyisocyanate, glycidol, and at least one bis(hydroxyl alkyl)-terminated PDMS. The invention also relates to non-isocyanate siloxane-modified GC resins consisting essentially of or consisting of the reaction product of at least one organic polyisocyanate, glycidol, and at least one bis(hydroxyl alkyl)-terminated PDMS.

Organic Polyisocyanate

The at least one organic polyisocyanate that may be used in the invention includes, but is not limited to, any suitable organic polyisocyanate, such as an aliphatic, cycloaliphatic, araliphatic, or aromatic polyisocyanate, either singly or in mixtures of two or more. The aliphatic isocyanates provide generally better light stability than the aromatic compounds. Aromatic polyisocyanates, on the other hand, are generally more economical and reactive toward polyols and other poly(active hydrogen) compounds than aliphatic polyisocyanates. Suitable aromatic polyisocyanates include, but are not limited to, those selected from the group consisting of 2,4-toluene diisocyanate, 2,6-toluene diisocyanate, a dimer of toluene diisocyanate (available under the Desmodur® trademark from Covestro LLC (formerly Bayer Materials Science), Leverkusen, Germany, diphenylmethane 4,4'-diisocyanate (MDI), 1,5-diisocyanato-naphthalene, 1,4-phenylene diisocyanate, 1,3-phenylene diisocyanate, fluorinated and/or silicone containing derivatives of the aforementioned, and mixtures thereof. Examples of useful cycloaliphatic polyisocyanates include, but are not limited to, those selected from the group consisting of dicyclohexylmethane diisocyanate ($H_{12}$ MDI, commercially available under the Desmodur® trademark from Covestro LLC (Bayer Materials Science), Leverkusen, Germany, isophorone diisocyanate (IPDI), 1,4-cyclohexane diisocyanate (CHDI), 1,4-cyclohexanebis(methylene isocyanate) (BDI), 1,3-bis(isocyanatomethyl)cyclohexane ($H_6$ XDI), and mixtures thereof. Examples of useful aliphatic polyisocyanates include, but are not limited to, those selected from the group consisting of hexamethylene 1,6-diisocyanate (HDI), 1,5-pentanediisocyanate (PDI) 1,12-dodecane diisocyanate, 2,2,4-trimethyl-hexamethylene diisocyanate (TMDI), 2,4,4-trimethyl-hexamethylene diisocyanate (TMDI), 2-methyl-1,5-penta methylene diisocyanate, dimer diisocyanate, the urea of hexamethyl diisocyanate, and mixtures thereof. Examples of useful araliphatic polyisocyanates include but are not limited to those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, or mixtures thereof. Preferably, the polyfunctional resin derived from isocyanate or biuret is selected from the group consisting of TDI (toluene diisocyanate), TDI biuret, MDI (diphenylmethane diisocyanate), MDI biuret, HDI (hexamethylene diisocyanate), HDI biuret, NDI (naphthalene diisocyanate), NDI biuret, HMDI (hydrogenated MDI), HMDI biuret, and IPDI (isophorone diisocyanate) and IPDI biuret. More preferably, a polyfunctional resin derived from isocyanate or biuret consists of HDI (hexamethylene diisocyanate) or HDI biuret. Exemplary organic polyisocyanates include those of formula (I) and (II) below:

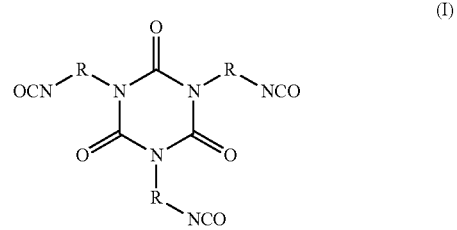

(I)

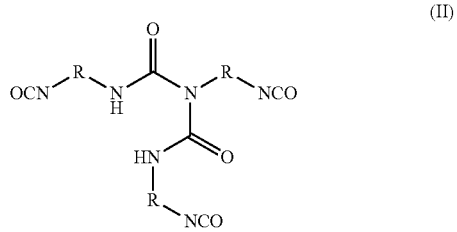

(II)

In formulas (I) and (II), R is independently an optionally substituted, divalent $C_1$-$C_{15}$ alkyl, an optionally substituted $C_3$-$C_{15}$ cycloalkyl, or a group selected from:

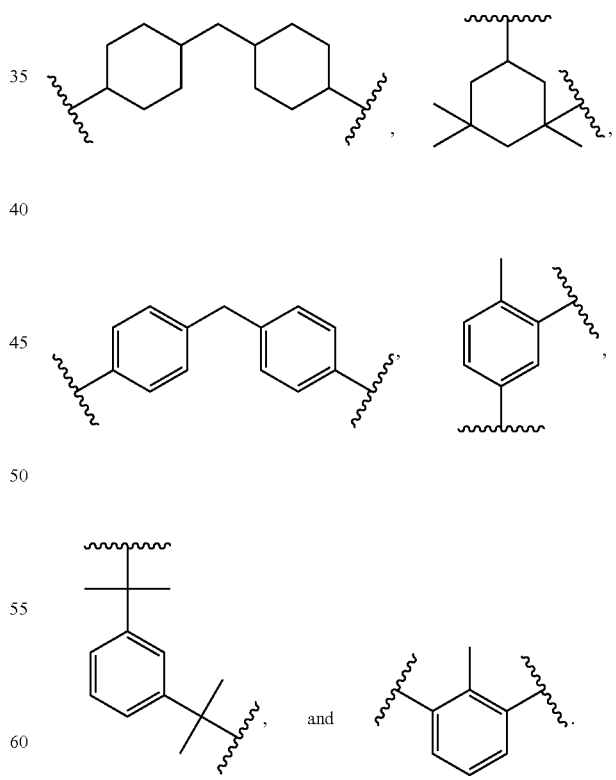

In certain embodiments of formulas (I) and (II), the divalent group R is a $C_2$-$C_{10}$ straight chain or branched alkyl, preferably a $C_4$-$C_8$ straight chain alkyl, pentyl, or hexyl.

Bis(Hydroxyl Alkyl)-Terminated Polydimethylsiloxane

The at least one bis(hydroxyl alkyl)-terminated polydimethylsiloxane (PDMS) used in the invention has the following general structure of formula (III):

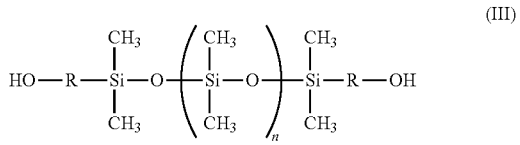

wherein in formula (III) the divalent group R is a $C_3$-$C_{12}$ straight chain alkyl, such as propyl, butyl, or pentyl, or an alkylene ether; and wherein n ranges from 0 to about 680. The variable "n" may be varied such that the molecular weight of the bis(hydroxyl alkyl)-terminated PDMS used in the invention may range from about 400 to about 50,000 Dalton, preferably from about 400 to about 20,000 Daltons, and more preferably from about 2,000 to about 4,500.

In one embodiment, the at least one bis(hydroxyl alkyl)-terminated PDMS used in the invention can be selected from a dicarbinol PDMS having the following general structure:

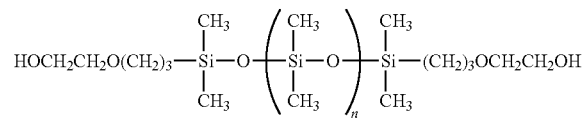

wherein n ranges from 0 to about 680. The at least one dicarbinol PDMS used in the invention may be purchased from Gelest, Inc.

As discussed above, another embodiment of the invention relates to a method of preparing a siloxane-modified GC resin of the invention. The siloxane-modified GC resin of the invention can be prepared by a variety of methods, including, but not limited to, the methods described below in the examples and generally depicted in Scheme 1. In preparing a siloxane-modified GC resin of the invention, the at least one bis(hydroxyl alkyl)-terminated PDMS may be reacted with the at least one organic polyisocyanate in amounts ranging from about 0.5% to about 20% equivalents, preferably from about 1% to about 15%, more preferably from about 2% to about 10% equivalents, from about 5% to about 10% equivalents, and even more preferably in about 5% equivalents, to the isocyanate groups in the organic polyisocyanate. Glycidol is reacted with the product of the reaction of the at least one organic polyisocyanate and the at least one bis(hydroxyl alkyl)-terminated PDMS in amounts to bring the percent equivalents to about 80%, to about 90%, or to about 100%. In other embodiments, the at least one organic polyisocyanate, at least one bis(hydroxyl alkyl)-terminated PDMS, and glycidol may be reacted step-wise (e.g., in a first step, the at least one organic polyisocyanate is reacted with the at least one bis(hydroxyl alkyl)-terminated PDMS, and in a second step, glycidol is reacted with the product of the first step, or in a first step, the at least one organic polyisocyanate is reacted with glycidol, and in a second step, the at least one bis(hydroxyl alkyl)-terminated PDMS is reacted with the product of the first step) or in a one-pot procedure. During synthesis of the siloxane-modified GC resins, the ratio of stoichiometric equivalents of NCO:PDMS-OH+glycidol may be maintained at 1:2, preferably 1:1 (for example, in a preferred embodiment, the ratio of NCO:PDMS-OH:glycidol is 6:2:4). In some embodiments, the PDMS can be used in the amount of 0.01 to 0.9 equivalents relative to NCO, preferably 0.05 to 0.5 equivalents, most preferably 0.05 to 0.2 equivalents. In some embodiments, a slight excess of the at least one organic polyisocyanate can be used in the reaction, and in some embodiments, an excess of glycidol can be used in the reaction to ensure complete consumption of isocyanate, but may be removed prior to using the resin in coatings of the invention, for example.

In one embodiment, the siloxane-modified GC resins of the invention can be prepared by combining the at least one organic polyisocyanate, glycidol, and at least one bis(hydroxyl alkyl)-terminated PDMS in the presence of at least one optional solvent and at least one optional catalyst. The type and amount of solvent and catalyst used to react the organic polyisocyanate and the at least one bis(hydroxyl alkyl)-terminated PDMS may be the same or different as the type and amount of solvent and catalyst used to react the glycidol with the product of the reaction of the organic polyisocyanate and the at least one bis(hydroxyl alkyl)-terminated PDMS. The solvent and catalyst may be used during any step of the synthesis of the siloxane-modified GC resins, including, for example, when the at least one organic polyisocyanate is reacted with the at least one bis(hydroxyl alkyl)-terminated PDMS, or when the glycidol is reacted with the reaction product of the at least one organic polyisocyanate and the at least one bis(hydroxyl alkyl)-terminated PDMS.

The solvent that may be used in the invention includes, but is not limited to, toluene, xylenes, n-butyl acetate (nBA), t-butyl acetate (TBA), acetone, methyl ethyl ketone (MEK), methyl n-amyl ketone (MAK), N-methyl pyrollidone (NMP), ethyl 3-ethoxyproprionate (EEP), and mixtures thereof. The amount of solvent used may vary. For example, the solvent may be present in an amount of about 90%, preferably about 50%, and more preferably about 20% or less. In some embodiments, a mixture of two or more solvents may be used, such as a mixture of toluene and EEP. In the case of the use of a mixture of solvents, for example a mixture of EEP and toluene, the amount of solvents used may be calculated such that the final resin has a target of 20%, preferably 50%, and more preferably 80%, solid in 50/50 w/w solvent blend of EEP and toluene. In some embodiments, one or more solvents may be used to solubilize the resin.

The catalyst that may be used in the invention can be organometallic complexes, organic bases, or mixtures thereof. Examples of organometallic compounds include, but are not limited to, dibutyl tin dilaurate, dibutyl tin diacetate, bismuth carboxylate, and compounds of zirconium and aluminum, such as, but not limited to, K-Kat® 4205, K-Kat® 5218, and K-Kat® XC-6212. Examples of organic base catalysts includes, but is not limited to, 1,4-diazabicyclo[2.2.2]octane, which is sold under the DABCO® trade name by Air Products. The amount of catalyst used may vary. For example, the catalyst may be present in an amount ranging from 0.001-0.10%, preferably 0.005-0.05%, and more preferably 0.05%, weight of total solids.

In one embodiment, the reaction to make the siloxane-modified GC resin may be carried out from about 40° C. to about 90° C., more preferably from about 50° C. to about 80° C. For example, in one embodiment, the at least one bis(hydroxyl alkyl)-terminated PDMS and at least one optional first solvent may be reacted with the at least one organic polyisocyanate and at least one optional second solvent, which may be the same or different and in the same or different amount as the first optional solvent, at about 80° C. The reaction may be carried out for any period of time necessary to react the at least one organic polyisocyanate with the at least one bis(hydroxyl alkyl)-terminated PDMS, for example, 0.5-5 hours, preferably 1-2 hours, more preferably 1-1.5 hours. At least one optional first catalyst may be added at any point during this reaction. Before the addition of glycidol, the temperature of the reaction may be lowered to, for example, between 40-45° C. Glycidol may then be added to the reaction product of the at least one organic polyisocyanate and the at least one bis(hydroxyl alkyl)-terminated PDMS, together with at least one optional third solvent and/or optional second catalyst, which may be the same of different and in the same or different amount as the other first and/or second solvent and/or first catalyst, for any period of time necessary to ensure complete consumption of isocyanate, for example, 0.5-5 hours, preferably 1-2 hours, more preferably 1-1.5 hours. Completion of the reaction may be determined, for example, by the disappearance of the NCO peak at 2272 cm$^{-1}$ as observed using FTIR.

Coating Compositions

As discussed above, the invention relates to coating compositions comprising at least one non-isocyanate siloxane modified GC resin of the invention and at least one curing agent, such as, for example, at least one amine crosslinker. In another embodiment, the invention relates to coating compositions consisting essentially or consisting of at least one non-isocyanate siloxane modified GC resin of the invention and at least one curing agent, such as, for example, at least one amine crosslinker.

In a coating composition of the invention, the ratio of the at least one non-isocyanate siloxane modified GC resin of the invention to the at least one curing agent may be varied. For example, in one embodiment, the ratio of the at least one non-isocyanate siloxane modified GC resin of the invention to the at least one amine crosslinker may be based on the stoichiometric ratio between the epoxy groups present in the at least one non-isocyanate siloxane modified GC resin of the invention and the amine hydrogen groups present in the at least one amine crosslinker. In one embodiment, the ratios of epoxy to amine hydrogen groups may be varied. For example, the stoichiometric ratio of epoxy to amine hydrogens may range from about 1:0.1 to about 1:3, from about 1:0.5 to about 1:2, or it may be about 1:1 to 1:2.

The at least one curing agent that may be used in the invention includes, but is not limited to, PACM (bis(para-aminocyclohexyl)methane), polyamines, polyamides, or mixtures thereof. Amine curing agents known in the art that may be used in the invention include, for example, diethylenetriamine, triethylenetetramine, tetraethylene-pentamine, etc. as well as 2,2,4- and/or 2,4,4-trimethylhexamethylenediamine; 1,2- and 1,3-diaminopropane; 2,2-dimethylpropylenediamine; 1,4-diaminobutane; 1,6-hexanediamine; 1,7-diaminoheptane; 1,8-diaminooctane; 1,9-diaminononae; 1,12-diaminododecane; 4-azaheptamethylenediamine; N,N"-bis(3-aminopropyl)butane-1,4-diamine; 1-ethyl-1,3-propanediamine; 2,2(4),4-trimethyl-1,6-hexanediamin; bis(3-aminopropyl)piperazine; N-aminoethylpiperazine; N,N-bis(3-aminopropyl)ethylenediamine; 2,4(6)-toluenediamine; dicyandiamine; melamine formaldehyde; tetraethylenepentamine; 3-diethylaminopropylamine; 3,3"-iminobispropylamine; tetraethylenepentamine; 3-diethylaminopropylamine; and 2,2,4- and 2,4,4-trimethylhexamethylenediamine. Exemplary cycloaliphatic amine curing agents include, but are not limited to, 1,2- and 1,3-diaminocyclohexane; 1,4-diamino-2,5-diethylcyclohexane; 1,4-diamino-3,6-diethylcyclohexane; 1,2-diamino-4-ethylcyclohexane; 1,4-diamino-2,5-diethylcyclohexane; 1,2-diamino-4-cyclohexylcyclohexane; isophorone-diamine; norbornanediamine; 4,4'-diaminodicyclohexylmethane; 4,4'-dia minodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3- and 1,4-bis(aminomethyl) cyclohexane; and 1-cyclohexyl-3,4-dimino-cyelohexane. As exemplary araliphatic amines, in particular those amines are employed in which the amino groups are present on the aliphatic radical for example m- and p-xylylenediamine or their hydrogenation products as well as diamide diphenylmethane; diamide diphenylsulfonic acid (amine adduct); 4,4"-methylenedianiline; 2,4-bis(p-aminobenzyl)aniline; diethyltoluenediamine; and m-phenylene diamine. The amine curing agents may be used alone or as mixtures. Suitable amine-epoxide adducts are, for example, reaction products of diamines such as, for example, ethylenediamine, diethylenetriamine, triethylenetetramine, m-xylylenediamine and/or bis(aminomethyl)cyclohexane with terminal epoxides such as, for example, polyglycidyl ethers of polyhydric phenols listed above. Exemplary amine curing agents which may be used with the coating formulations of the invention are PACM, polyamines, such as Ancamine® 2143 or Ancamine® 2432, and polyamides, such as Ancamide® 2634, Ancamide® 2767, diethylene triamine (DETA), and 4,4'-methylene dianiline (MDA).

A further embodiment of the invention is related to coating compositions where an aminopropyl-terminated PDMS is used as an amine crosslinker. Aminopropyl-terminated PDMS may be added to the formulations to find the optimum formulation suited for fouling release (FR) applications. This amine crosslinker can be used by itself or in mixtures with one of the curing agents listed above.

Pigments, Additives, Solvents, and Fillers

Pigments and other additives known in the art to control coating rheology and surface properties can also be incorporated in a coating composition of the invention. For example, a coating composition of the invention may further contain coating additives. Such coating additives include, but are not limited to, one or more leveling, rheology, and flow control agents such as silicones, fluorocarbons, or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives may be found in U.S. Pat. No. 5,371,148, incorporated herein by reference.

Examples of flatting agents that may be used in the coatings of the invention include, but are not limited to, synthetic silica, available from the Davison Chemical Division of W. R. Grace & Company as SYLOID®; polypropylene, available from Hercules Inc., as HERCOFLAT®; synthetic silicate, available from J. M. Huber Corporation, as ZEOLEX®.

Examples of viscosity, suspension, and flow control agents that may be used in the coatings of the invention include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Solvents may also be added to the coating compositions of the invention in order to reduce the viscosity, some of which may also be used in the synthesis of the non-isocyanate siloxane modified GC resin of the invention. For example, hydrocarbon, ester, ketone, ether, ether-ester, alcohol, or ether-alcohol type solvents may be used individually or in mixtures. Examples of solvents that can be added to the coating compositions of the invention include, but are not limited to benzene, toluene, xylene, aromatic 100, aromatic 150, acetone, methylethyl ketone, methyl amyl ketone, butyl acetate, t-butyl acetate, tetrahydrofuran, diethyl ether, ethylethoxy propionate, isopropanol, butanol, butoxyethanol, and so on. Alternatively, the solvent system may include water or be water-based (>50% water in the solvent system).

Fillers may also be added to the coating compositions of the invention, including, but not limited to, calcium carbonate such as calcite, dolomite, talc, mica, feldspar, barium sulfate, kaolin, nephelin, silica, perlite, magnesium oxide, and quartz flour, etc. Fillers (and pigments) may also be added in the form of nanotubes or fibers, thus, apart from the before-mentioned examples of fillers, the coating composition may also comprise fibers, e.g., those generally and specifically described in WO 00/77102, incorporated herein by reference.

As discussed above, another embodiment of the invention relates to a method of preparing a coating composition of the invention. In one embodiment, this method comprises the reaction of at least one non-isocyanate siloxane modified GC resin of the invention and at least one curing agent. Suitable curing agents are the same as described above for those suitable for the coating compositions of the invention.

The coating compositions of the invention may be cured at ambient or elevated (e.g., about 80° C.) temperatures. The at least one curing agent, such as an amine crosslinker, typically allows the coating to cure at ambient temperatures.

As also discussed above, the invention also relates to a fouling-release (FR) coating system comprising at least one coating composition of the invention, and a method of applying said FR coating systems to substrates. "Fouling-release" means all types of bio-fouling of a surface (i.e., settlement of organisms on a surface), in particular surfaces exposed to an aqueous environment or to aqueous liquids (e.g., ship surfaces, within tanks, pipes, etc.). The FR coating systems described herein are particularly relevant for avoiding, limiting, or reducing marine bio-fouling, i.e., bio-fouling arising in connection with the exposure of a surface to a marine environment, in particular sea water.

The coating composition of the invention is typically applied to at least a part of the surface of a substrate. The term "applying" is used in its normal meaning within the paint industry. Thus, "applying" is conducted by means of any conventional means, e.g., by brush, by roller, by spraying (e.g., convention air-atomized spray, airless spray, HVLP), by dipping, by drawdown, etc. The commercially most interesting way of "applying" the coating composition of the invention is by spraying. Hence, the coating composition is preferably sprayable. Spraying is effected by means of conventional spraying equipment known to the person skilled in the art. The coating is typically applied in a dry film thickness of 50-600 μm, such as 50-500 μm, e.g., 75-400 μm, or 20-150 μm, or 30-100 μm.

The term "at least a part of the surface of a substrate" refers to the fact that the coating composition of the invention may be applied to any fraction of the surface (or, for that matter, the entire surface). For many applications, the coating composition is at least applied to the part of the substrate (e.g., a vessel) where the surface (e.g., the ship's hull) may come in contact with water, e.g., sea-water.

The term "substrate" means a solid material onto which the coating composition is applied. The substrate typically comprises a metal such as steel, iron, aluminum, or glass- or carbon-fiber composite, but also includes wood, plastic, and glass. In one embodiment, the substrate is a metal substrate, in particular a steel substrate. In another embodiment, the substrate is a glass-fiber reinforced polyester substrate. In some embodiments, the substrate is at least a part of the outermost surface of a marine structure.

The term "surface" is used in its normal sense, and refers to the exterior boundary of an object. Particular examples of such surfaces are the surface of marine structures, such as vessels (including, but not limited to, boats, yachts, motorboats, motor launches, ocean liners, tugboats, tankers, container ships and other cargo ships, submarines, and naval vessels of all types), pipes, shore and off-shore machinery, constructions and objects of all types such as piers, pilings, bridge substructures, water-power installations and structures, underwater oil well structures, nets and other aquatic culture installations, and buoys, etc.

The surface of the substrate may be the "native" surface (e.g., the steel surface). However, the substrate is typically coated, e.g., with an anticorrosive coating, so that the surface of the substrate is constituted by such a coating. When present, the anticorrosive coating is typically applied in a total dry film thickness of 20-200 μm, such as 50-150 μm, e.g., 80-125 μm. Alternatively, the substrate may carry a paint coat, e.g., a worn-out fouling release paint coat, or similar. One advantage of the FR coating systems described herein is that they can be applied directly onto the primed surface without a tie-coat. However, the FR coating systems described herein can also be applied onto a tie-coat if desired.

In one embodiment, the substrate is a metal substrate (e.g., a steel substrate) coated with an anticorrosive coating such as an anticorrosive epoxy-based coating, e.g., cured epoxy-based coating, or a shop-primer, e.g., a zinc-rich shop-primer. In another embodiment, the substrate is a glass-fiber reinforced polyester substrate coated with an epoxy primer coating.

The invention also relates to a method of establishing a FR coating system on at least a part of the surface of a substrate, comprising the step of applying one or more layers of at least one coating composition of the invention onto at least a part of the surface of said substrate, e.g., either a native substrate or a substrate already carrying one or more coatings, as the case may be, and allowing said layer(s) to cure.

The invention also relates to a method of establishing a FR coating system on at least a part of the surface of a substrate, comprising the sequential steps of: a) applying one or more layers of a primer composition onto at least a part of the surface of said substrate, and allowing said layer(s) to cure, thereby forming a primed substrate, b) optionally applying one or more layers of a tie-coat composition onto at least a part of the surface of said primed substrate, and allowing said layer(s) to cure, thereby forming a cured tie-coat; and c) applying one or more layers of at least one coating composition of the invention onto at least a part of the surface of said primed substrate or the surface of said tie-coat, as the case may be, and allowing said layer(s) to cure.

The invention further relates to a method of establishing a FR coating system on at least a part of the surface of an aged antifouling coating system, comprising the sequential steps of: a) applying one or more layers of a sealer/link-coat composition onto at least a part of the surface of said substrate, allowing said layer(s) to cure, thereby forming a sealed substrate, b) optionally applying one or more layers of a tie-coat composition onto at least a part of the surface of said sealed substrate, and allowing said layer(s) to cure, thereby forming a cured tie-coat; and c) applying one or more layers of at least one coating composition of the invention onto at least a part of the surface of said primed substrate or at least a part of the surface of said tie-coat, as the case may be, and allowing said layer(s) to cure.

The invention further relates to a method of establishing a FR coating system on at least a part of the surface of an aged fouling release coating system, comprising the sequential steps of: a) optionally applying one or more layers of a tie-coat composition onto at least a part of the surface of said aged fouling release coating system, and allowing said layer(s) to cure, thereby forming a cured tie-coat; and b) applying one or more layers of at least one coating composition of the invention onto at least a part of the surface of said primed substrate or the surface of said tie-coat, as the case may be, and allowing said layer(s) to cure.

The invention also provides a marine structure comprising on at least a part of the outer surface thereof an outermost FR coating system as described herein. In particular, at least a part of the outer surface carrying the outermost coating is a submerged part of said structure.

In one embodiment, the FR coating system of the marine structure may comprise or consist of an anticorrosive layer, a tie-coat, and the FR coating system as described herein.

In another embodiment, the FR coating system is applied on top of a used FR coating system, e.g., on top of a used coating composition of the invention.

In one embodiment of the above marine structure, the anticorrosive layer has a total dry film thickness of 20-200 µm, such as 50-150 µm, e.g., 80-125 µm; the tie-coat has a total dry film thickness of 50-500 µm, such as 50-400 µm, e.g., 75-350 µm or 75-300 µm or 75-250 µm; and the coating of the FR coating system has a total dry film thickness of 20-500 µm, such as 20-400 µm, e.g., 50-200 µm.

Another embodiment of the marine structure is that where at least a part of the outermost surface of said structure is coated with a FR coating system comprising a total dry film thickness of 80-125 µm of an anticorrosive layer of an epoxy-based coating established by application of 1-4, such as 2-4, layers; a total dry film thickness of 20-400 µm of the tie-coat established by application of 1-2 layers; and a total dry film thickness of 20-400 µm of the coating of the FR coating system established by application of 1-2 layers.

In another embodiment of the above marine structure, the FR coating system is applied directly on the anticorrosive layer without the use of tie-coat.

As also discussed above, in another embodiment of the invention, the invention relates to an article of manufacture comprising a coating composition of the invention and a method of making such article. The invention also provides methods for coating such substrates by applying the coating composition to the substrate. The coating may be cured at ambient temperatures or above.

EXAMPLES

Materials

Dixie Chemicals supplied glycidol. To reduce formation of impurities, glycidol was refrigerated. See, e.g., Cardillo et al., *Journal of Loss Prevention in the Process Industries* 1991, 4(4), 242-245. Covestro (Bayer MaterialScience) provided hexamethylene diisocyanate (HDI) trimer (Desmodur 3300A). ASTM D 2572 determined isocyanate equivalent weight. Dicarbinol polydimethylsiloxane (DMS-C21) with molecular weight 5000 g/mol was purchased from Gelest. Dibutyltin diacetate (DBTDAc), ethyl-3-ethoxy propionate (EEP), and toluene were purchased from Sigma Aldrich. Air Products provided amine crosslinkers. Intergard 264 primer and crosslinker were purchased from Interbay Coatings.

Aminopropyl-terminated polydimethylsiloxane (APT-PDMS) was synthesized in a fashion similar to the one described in prior publication. See Sommer et al., *J. Coating. Tech. Res.* 2011, 8(6), 661-670. Chemicals for the synthesis of APT-PDMS, siloxane monomer ($D_4$), benzyltriammonium hydroxide solution, and blocker bis(3-aminopropyl)-tetramethyldisiloxane (BAPTDMS), were purchased from Dow Chemical, Sigma Aldrich, and Gelest, respectively. $D_4$, benzyltriammonium hydroxide solution in methanol, and BAPTDMS were equilibrated at 80° C. for 24 hours in a round bottom flask, equipped with a nitrogen inlet, condenser, heating mantle, and temperature controller. After 24 hours, the temperature was increased to 170° C. for 2 hours to decompose the catalyst. After the completion of the reaction, the product was cooled to room temperature and stored.

Synthesis of Siloxane-Modified GC Resin (IGC_PDMS)

A four necked round bottom flask was fitted with a condenser, nitrogen inlet, a thermocouple, and a mechanical stirrer. During synthesis of the resin, the ratio of equivalents of NCO:PDMS hydroxyl groups:glycidol was maintained at 6:2:4. The amount of solvents, EEP and toluene, was calculated such that the final resin would have a target 50% solid in 50/50 w/w solvent blend of EEP and toluene. In the first step, the flask was charged with HDI and the required amount of EEP solvent. The amount of the dicarbinol PDMS was maintained at 5% equivalents of HDI trimer). Once HDI and EEP were homogeneously mixed, PDMS and catalyst DBTDAc (0.025% weight of total solids) was added to the flask. Temperature was maintained at 80° C. for 1-1.5 hours. The reaction scheme is shown in Scheme 1 below.

In the next step, before the addition of glycidol, temperature was reduced to about 40° C. A solution of glycidol in the required amount of toluene was then added to the flask at about 40° C. The reaction of glycidol with isocyanate is highly exothermic; glycidol solution in toluene provides better control over temperature increase. The reaction was allowed to proceed at about 45-50° C. for 1.5-2 hours. Completion of the reaction was determined by the disappearance of the NCO peak at 2272 cm$^{-1}$ as observed using FTIR. See FIG. 1.

Scheme 1: Reaction scheme for synthesis of siloxane-modified glycidyl carbamate (IGC_PDMS) resin.
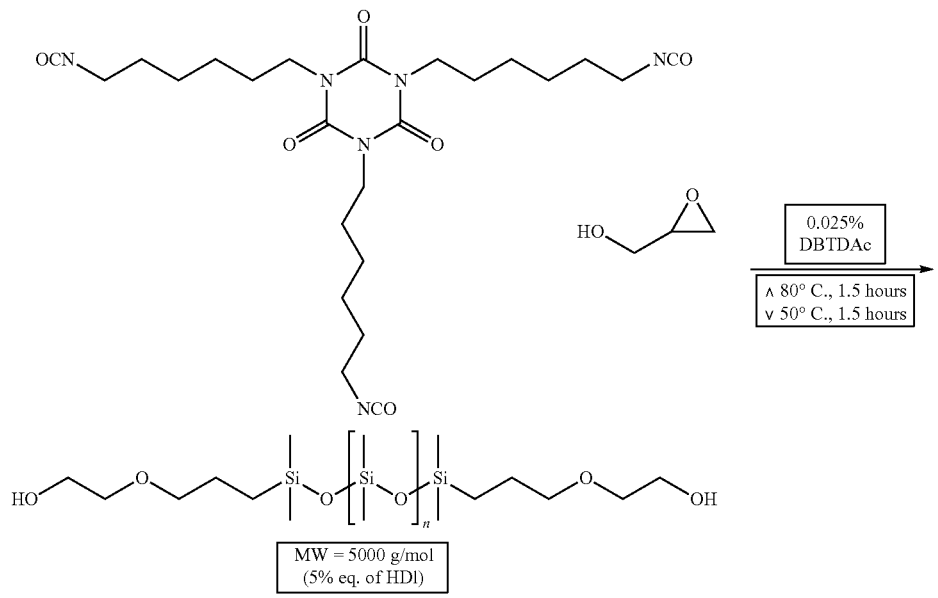
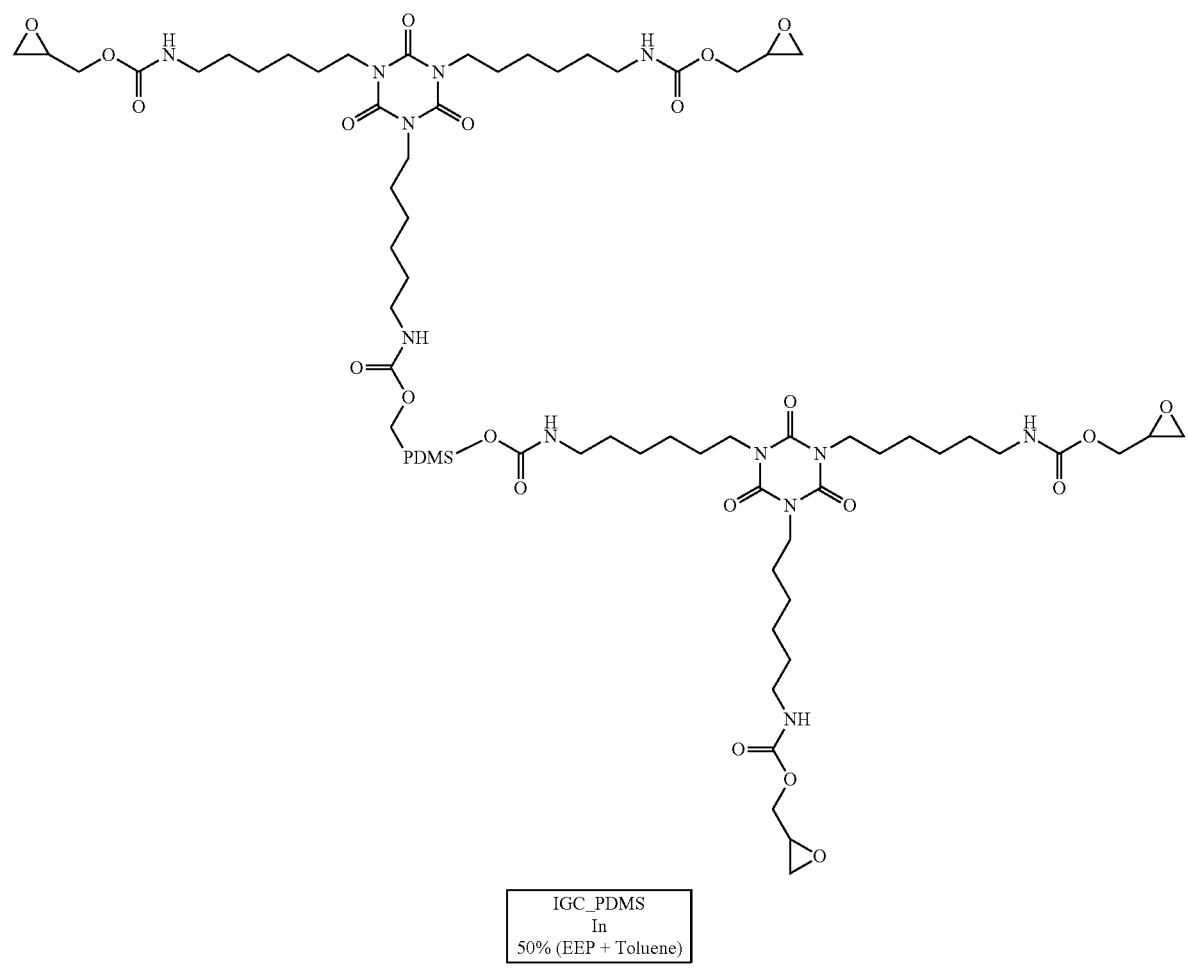

Resin Characterization

The following methods were used to characterize the prepared siloxane-modified glycidyl carbamate (IGC_P-DMS) resin:

Infrared Spectra:

A Nicolet 8700 FT-IR (Thermoscientific, America) recorded the infrared spectra (FT-IR) of the resin. A small amount of resin sample was coated onto a potassium bromide plate. 32 scans were taken for the resin sample.

$^{13}$C-NMR:

A Bruker 400 $^{13}$C-NMR analyzed a dilute solution of the resin in $CDCl_3$.

Percent Solids:

ASTM 2369 determined percent solids of the resin. About 1 gm of the resin, measured accurately, was added to aluminum pans. The pans were heated in an oven at 120° C. for 1 hour. The experimental value of percent solids was calculated using the weight of the resin before and after heating. The average of three solids values was recorded as the experimental value of the resin solids.

Epoxy Equivalent Weight:

ASTM D 1652 determined experimentally the epoxy equivalent weight (EEW) of the resin. About 1 gm of the resin, accurately measured up to the fourth decimal place, was added to an Erlenmeyer flask. About 10-15 ml of chloroform was added to the flask to completely dissolve the resin sample. Crystal violet was used as the indicator. The resin solution was titrated against 0.1 N HBr solution. Color change from violet to blue-green was considered to be the end point of titration. The average of three titrations was recorded as the EEW of the resin.

Coating Formulations

The above siloxane-modified glycidyl carbamate (IGC_P-DMS) resin was crosslinked using different amine crosslinkers, including PACM, Ancamine 2143, Ancamine 2432, Ancamide 2634, and Ancamide 2767. Epoxy:amine hydrogen ratio was varied as 1:1, 1:2, and 2:1 for select coating formulations. Additionally, varying amounts of APT-PDMS were added to the coating formulations to identify the coating formulations that show optimum FR performance. In an attempt to improve compatibility between the different components in the coating formulations, APT-PDMS was added as a 33% solution in toluene. The coating formulations were mixed using a magnetic stirrer for 20 min. The coating formulations were then sonicated for another 10 minutes to remove bubbles. Aluminum and glass panels were used as substrates. Aluminum panels were subjected to sandblasting and primer (Intergard 264 primer) application prior to applying coating formulations. Coating formulations were applied onto primed panels using Meyer rod (RDS 80). Glass substrates were used to obtain free films for analysis with DSC and TGA. Formulations were applied onto glass substrates using a drawdown bar with 8 mils wet film thickness. Coatings cured with PACM were oven-cured at 80° C. for 45 min. Coatings cured using the polyamines and polyamides were cured at room temperature (RT) for 3 weeks. Table 1 shows exemplary coating formulations of the invention.

TABLE 1

Coating Formulations.

| Amine crosslinkers | APT-PDMS (% resin solids) | Curing Conditions | Coating Labels[a] |
|---|---|---|---|
| PACM | 0, 1, 2, 3, 4, 5, 10, 15, 20, 30 | 80° C., 45 min | PACM_x:y_Fx |
| Ancamine 2143 | 0, 1, 2, 3, 4 | Room temperature, 3 weeks | 2143_x:y_Fx |
| Ancamine 2432 | 0, 1, 2, 3, 4 | Room temperature, 3 weeks | 2432_x:y_Fx |
| Ancamide 2634 | 0, 1, 2, 3 | Room temperature, 3 weeks | 2634_x:y_Fx |
| Ancamide 2767 | 0, 1, 2, 3 | Room temperature, 3 weeks | 2767_x:y_Fx |

[a]Coating labels used herein are of the format amine crosslinker_epoxy:amine hydrogen ratio_F % APT-PDMS in formulations.

Coating Characterization

After completion of the curing schedule, the coatings were characterized for their solvent resistance, mechanical properties, and impact strength using the following methods:

Chemical Resistance and Extent of Crosslinking:

Methyl ethyl ketone (MEK) double rub test (ASTM D 5402) determined the chemical resistance and extent of crosslinking of the coating network. A 26-oz hammer with three layers of cheesecloth was soaked in MEK solvent. The cheesecloth was rewet with MEK after 100 double rubs. The number of double rubs that resulted in surface mar or discoloration of the surface were noted.

Surface Hardness:

Konig pendulum hardness (ASTM 4366) measured the surface hardness of the coatings and the results were reported in seconds.

Reverse Impact Strength:

A Gardener impact tester (ASTM D 2794) determined the reverse impact strength of the coatings. The maximum drop height was 43 in. and the drop weight was 3.92 lb. The results were reported as crazing or loss of adhesion or film failure in inch-pounds (in-lbs).

Pencil Hardness:

ASTM D 3363 determined the pencil hardness of the coatings.

Flexibility:

Conical mandrel bend (ASTM D 522) determined the flexibility of the coatings. The results were reported as no failure or the length of the crack formed during experimentation.

Gloss at 60°:

Specular gloss was determined according to ASTM D 523 using a BYK Gardner GmbH Micro-TRI-Gloss.

Based on the results obtained from the above experiments combined with the appearance of the coatings, optimum coatings were further characterized for their thermal behavior using the following methods:

Differential Scanning calorimetry:

TA Instruments Q1000 Differential Scanning calorimetry (DSC) determined the thermal analysis of select coatings. Coating samples were subjected to heat-cool-heat cycle for temperature ranges between −20° C. to 250° C. Heating and cooling rates were maintained at 10° C./min and 5° C./min, respectively. Glass transition temperature ($T_g$) was determined as the temperature of inflection at mid-point.

Thermogravimetric Analysis (TGA):

TA Instruments Q500 Thermogravimetric Analysis (TGA) determined the degradation behavior of select coatings. All samples were heated to 800° C. at a heating rate of 10° C./min.

Stratification of PDMS to form a hydrophobic surface was determined using the following contact angle and surface energy methods:

Contact Angles:

First Ten Angstroms (FTA 125) system determined the water contact angles (WCA) and methylene iodide contact angles (MICA) of coatings with epoxy:amine hydrogen=1:1 by sessile drop method. Three WCA and MICA for each coating were measured at three different spots on the coating panel. FTA software analyzed the contact angles.

Surface Energy:

The surface energy (SE) of the coatings were calculated by the Owen-Wendt method using the average of three WCA and MICA values. See Owens et al., *J. Appl. Polym. Sci.* 1969, 13(8), 1741-1747. As described in this paper, WCA and SE values reported were measured after the coatings were pre-leached for 42 days.

Select coatings were also characterized for their biofouling properties against diatoms, biofilm, mussels, and barnacles using the following assays and methods:

Preleaching and Leachate Toxicity Analysis:

Coatings with epoxy:amine hydrogen=1:1 were analyzed for FR experiments. PACM_1:1_Fx, Ancamine 2143_1:1_Fx, and Ancamine 2432_1:1_Fx coatings were placed in a recirculating water tank for six weeks to remove toxic leachates, impurities, and catalyst before analysis with biological organisms. See Bodkhe et al., *Prog. Org. Coat.* 2012, 75(1), 38-48. After six weeks, algal solution in artificial sea water (ASW) with nutrients was introduced onto the coatings to test leachate toxicity. Fluorescence was used to observe the growth of algae on the coatings after 48 hours. The growth of the organisms on the coatings was reported as a fluorescence ratio to a positive growth control. A negative growth control (medium+ bacteria+ triclosan) was also included in the experiment. The coatings were compared to the negative control to confirm the absence of toxic leachates. See Sommer et al., *J. Coating. Tech. Res.* 2011, 8(6), 661-670. Leachate toxicity test showed that the coatings cured using Ancamine 2143 (2143_1:1_Fx) were extremely toxic. Therefore, further FR analysis experiments with the Ancamine 2143 cured coatings were discontinued.

Diatom *Navicula incerta* (*N. incerta*) Attachment and Removal:

Diatom *N. incerta* adhesion was carried out as explained in earlier publications. See Sommer et al., *J. Coating. Tech. Res.* 2011, 8(6), 661-670; Ekin et al., *J. Coating. Tech. Res.* 2007, 4(4), 435-451; Cassé et al., *Biofouling* 2007, 23(2), 121-130; Chen et al., *Polym. Int.* 2008, 57(6), 879-886; Kim et al., *Biofouling* 2008, 24(4), 313-319. 24-well plates were prepared by carefully punching out discs from PACM_1:1_Fx and Ancamine 2432_1:1_Fx coatings. The discs were then glued to the well plates using a silicone adhesive from Dow Corning, such that the glue covered the circular basal area completely. The plates were then treated with 1 ml solution of algae in ASW and incubated for 2 hours to allow diatom adhesion. The settlement of diatoms on the coatings was quantified using fluorescence. After 2 hours, the well plates were subjected to water jet at 10 psi and 20 psi for 10 seconds to determine release of diatoms from the coatings. The first column in each well plate was used as a reference for the initial cell settlement and was not subjected to water jet. Results obtained from the test are described herein as percent removal of diatoms at 10 psi and 20 psi water pressure.

Biofilm *Cellulophaqa lytica* (*C. lytica*) Adhesion and Removal:

Bacterial biofilm *C. lytica* adhesion test was carried out in a fashion similar to diatom attachment. See Sommer et al., *J. Coating. Tech. Res.* 2011, 8(6), 661-670; Majumdar et al., *Biofouling* 2008, 24(3), 185-200; Kugel et al., *J. Coating. Tech. Res* 2009, 6(1), 107-121; Stafslien et al., *J. Comb. Chem.* 2006, 8(2), 156-162. Crystal violet colorimetry was used to determine *C. lytica* retention on the cured coatings. Circular discs were carefully punched from PACM_1:1_Fx and Ancamine 2432_1:1_Fx coatings. The discs were glued to the plates using a silicone adhesive from Dow Corning. 5% suspension of *C. lytica* in ASW ($10^7$ cells/ml) with nutrients was prepared. 1 ml suspension was dispensed in each well. The plates were incubated for 24 hours at 28° C. to allow colonization of the biofilm on the coatings. The plates were rinsed three times with deionized water to remove unattached biofilm. Crystal violet was used to stain the samples. Extractions of crystal violet in acetic acid (33%) were observed under 600 nm absorbance, to determine amount of biofilm retained on the coatings. After 24 hours, the wells were subjected to water jets at 10 psi and 20 psi for 5 seconds. See Stafslien et al., *Rev. Sci. Instrum.* 2007, 78(7), 072204. The first column in each 24-well plate served as a reference for bacterial growth before water jetting and was not exposed to water jet. Final results are described herein as the percent removal of the biofilm from the coating surface at 10 psi and 20 psi water jet pressures.

Mussel *Geukensia demissa* Adhesion:

Select PACM and Ancamine 2432 cured coatings were evaluated for adhesion of marine mussels *Geukensia demissa*, according to a previously published procedure. See Bell et al., *Mar. Ecol. Prog. Ser.* 1997, 159, 197-208; Burkett et al., *J. Adhes.* 2009, 85(9), 601-615; Crisp et al., *J. Colloid Interface Sci.* 1985, 104(1), 40-50. Before the start of the experiment, every marine mussel (received from Duke University Marine Laboratory, North Carolina, USA) was fitted with a 4 cm long acetal rod, using a 3M acrylic adhesive. The rods were attached perpendicular to the ventral edge of the mussel. Six mussels were immobilized on PACM_1:1_F0, PACM_1:1_F2, PACM_1:1_F4, PACM_1:1_F5, PACM_1:1_F10, PACM_1:1_F15, PACM_1:1_F20, and PACM_1:1_F30 coatings using a custom designed PVC template. The select coatings were placed in ASW so that the mussels can be fed live marine phytoplankton for 3 days. After 3 days, the number of mussels showing attachment of byssus threads was recorded for each coating. The acetal rods on the mussels were attached to a tensile force gauge, such that all the mussels were pulled from the coating at the same time. Results were reported as the average force in Newtons required to completely detach all byssus threads of the mussel from the surface. Results for the select PACM coatings are described herein.

Adult Barnacle *Amphibalanus amphitrite* (*A. amphitrite*) Reattachment:

Select PACM_1:1_Fx and Ancamine 2432_1:1_Fx coatings were also analyzed for barnacle adhesion to determine their FR performance against barnacles. See Sommer et al., *J. Coating. Tech. Res.* 2011, 8(6), 661-670; Majumdar et al., *J. Coating. Tech. Res.* 2007, 4(2), 131-138; Rittschof et al., *Biofouling* 2008, 24(1), 1-9. Six adult *A. amphitrite* barnacles, with basal diameter of approximately 5 mm, were allowed to grow and attach to the select coatings for 2 weeks. The barnacles were fed brine shrimp nauplii in ASW for 2 weeks. After 2 weeks, a hand held digital gauge was used to measure the force required to detach the barnacles in shear from the coatings. Adhesion strength (MPa) of the barnacles was then calculated as the shear force required for barnacle removal to the basal area of the barnacle. Results for PACM cured coatings are described herein.

Results

Non-Isocyanate Siloxane-Modified Glycidyl Carbamate Resins

Figure 2:
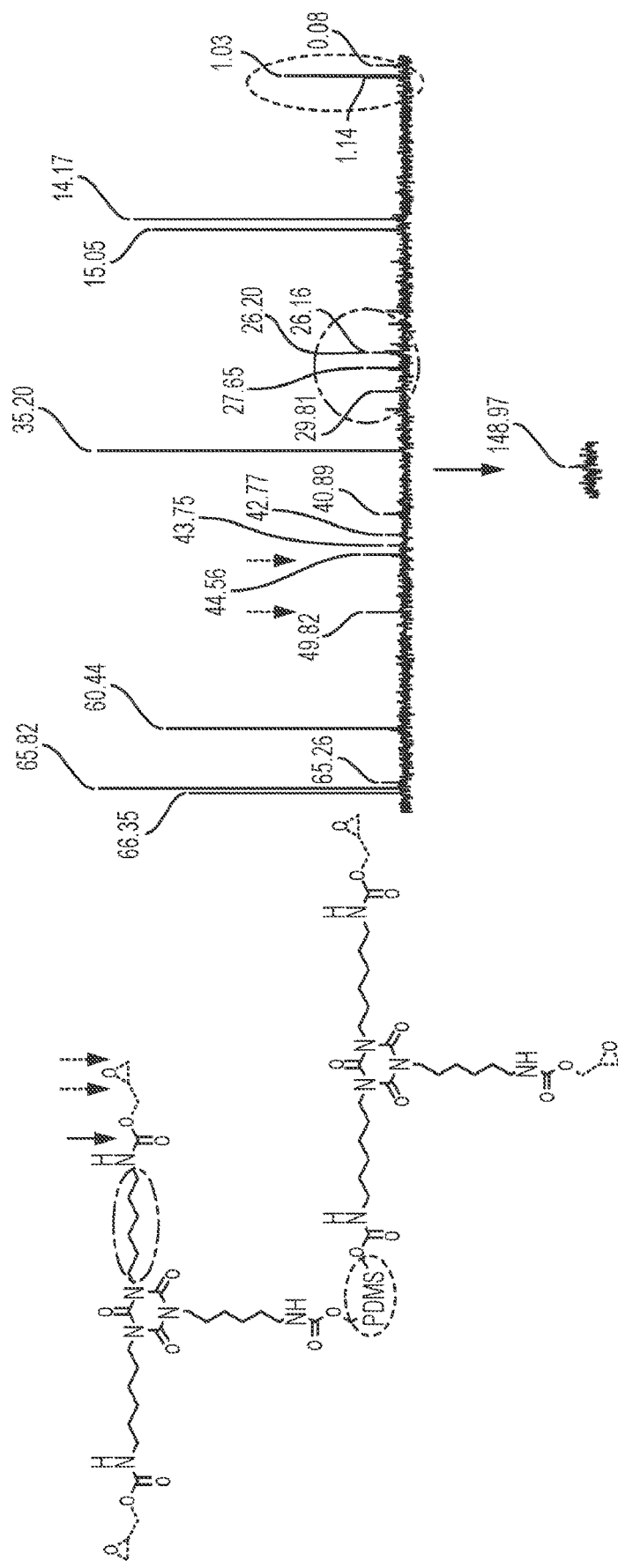
FIG. 2 shows a $^{13}$C-NMR for a siloxane-modified glycidyl carbamate resin of the invention. All shifts are in ppm.

To find "safer" alternatives for isocyanate-based polyurethanes, a novel non-isocyanate siloxane-modified GC resin of the invention (IGC_PDMS) was synthesized using an isocyanate (HDI) trimer, glycidol, and dicarbinol terminated PDMS (MW=5000 g/mol). The amount of PDMS was maintained at 5% equivalents of HDI trimer. FTIR and $^{13}$C-NMR characterized the resin. From FIG. 1, the disappearance of the isocyanate peak at 2272 cm$^{-1}$ indicated that the isocyanate has completely reacted signifying the completion of the reaction. The small peak seen in the scan maybe due to the presence of excess isocyanate added during synthesis. Wavenumbers at 910 cm$^{-1}$, about 1100 cm$^{-1}$, and about 3400 cm$^{-1}$ represent epoxy rings, Si—O—Si vibrations, and NH groups, respectively, in the resin. From FIG. 2, chemical shifts at 1 ppm, 44 and 49 ppm, and 149 ppm indicate C atoms from PDMS, oxirane ring, and carbamate linkage, respectively. The synthesized resin was characterized for percent solids and EEW. Experimental value of resin solids was calculated to be about 50% (theoretical target-50%). The EEW values for the resin was determined to be in the range from 350-450 gm/eq.

Coating Formulations

All coatings were characterized for their solvent resistance, mechanical strength, and impact strength. Dry film thickness values of all coatings was between 30 to 60 μm. The results for select coatings with varying epoxy:amine hydrogen ratios are shown in Tables 2-4.

TABLE 2

Results for coatings with epoxy:amine hydrogen ratio of 1:1.

| Coatings | MEK Double Rubs | König Pendulum (s) | Pencil Hardness | Impact (in-lbs) | $^a$Mandrel Bend | Gloss at 60° |
|---|---|---|---|---|---|---|
| PACM_1:1_F0 | >400 | 78 | 2H | >160 | NF | 82.37 |
| PACM_1:1_F1 | >400 | 74 | HB | >160 | NF | 87.30 |
| PACM_1:1_F2 | >400 | 68 | B | >160 | NF | 85.70 |
| PACM_1:1_F3 | >400 | 62 | 2B | >160 | NF | 85.27 |
| 2143_1:1_F0 | >400 | 68 | 6H | 78.40 | NF | 57.13 |
| 2143_1:1_F1 | >400 | 76 | 7H | 70.56 | NF | 57.67 |
| 2143_1:1_F2 | >400 | 78 | 5H | 70.56 | NF | 60.63 |
| 2143_1:1_F3 | >400 | 75 | 6H | 70.56 | NF | 54.43 |
| 2432_1:1_F0 | >400 | 64 | 3B | 117.6 | NF | 85.77 |
| 2432_1:1_F1 | >400 | 64 | 3B | 94.08 | NF | 75.87 |
| 2432_1:1_F2 | >400 | 67 | 2B | 109.76 | NF | 71.13 |
| 2432_1:1_F3 | >400 | 67 | 3B | 125.44 | NF | 67.07 |
| 2634_1:1_F0 | 220 | 88 | B | 86.24 | NF | 13.67 |
| 2634_1:1_F1 | >400 | 83 | B | 1176 | NF | 17.47 |
| 2634_1:1_F2 | >400 | 82 | HB | 141.12 | NF | 45.13 |
| 2634_1:1_F3 | 175 | 82 | HB | $^b$ | NF | 41.77 |
| 2767_1:1_F0 | >400 | 104 | 6H | 39.20 | NF | 45.30 |
| 2767_1:1_F1 | 300 | 99 | 6H | 39.20 | NF | 35.70 |
| 2767_1:1_F2 | 200 | 100 | 5H | 19.60 | 1 cm tear | 60.53 |
| 2767_1:1_F3 | 75 | 101 | 5H | 35.28 | 1 cm tear | 73.13 |

$^a$NF indicates no failure in the film after experiment.
$^b$ Non-uniformity of the coating surface resulted in large variations in impact strength values.

From Table 2, coatings with PACM showed good solvent resistance, high hardness, and high impact strength. The coatings also showed high gloss at an angle of 60°. Coatings with polyamines showed better properties compared to polyamides. After 3 weeks of curing at ambient conditions, Ancamine 2143 showed complete crosslinking of the coating film. The coatings showed high pencil hardness values, but poor impact strength. Coatings cured using Ancamide 2634 and 2767 did not cure completely after 3 weeks, except 2634_1:1_F1, 2634_1:1_F2, and 2767_1:1_F0. In spite of the incomplete cure, coatings cured using polyamides showed high values for pendulum hardness. High hardness values may have resulted in decrease in flexibility of the coatings. In general, all coatings cured under ambient conditions, using either polyamine or polyamide, possessed low gloss and showed phase separation of PDMS on the surface. Ambient curing also resulted in sticky or oily coating surface.

TABLE 3

Results for coatings with epoxy:amine hydrogen ratio of 1:2.

| Coatings | MEK Double Rubs | König Pendulum (s) | Pencil Hardness | Impact (in-lbs) | $^a$Mandrel Bend | Gloss at 60° |
|---|---|---|---|---|---|---|
| PACM_1:2_F0 | >400 | 92 | H | >160 | NF | 100.9 |
| PACM_1:2_F1 | >400 | 88 | 2H | >160 | NF | 86.33 |
| PACM_1:2_F2 | >400 | 87 | H | >160 | NF | 74.53 |
| PACM_1:2_F3 | >400 | 84 | 2B | >160 | NF | 80.97 |
| 2143_1:2_F0 | >400 | 70 | 7H | >160 | NF | 42.60 |
| 2143_1:2_F1 | >400 | 59 | 8H | >160 | NF | 41.67 |
| 2143_1:2_F2 | >400 | 69 | 7H | >160 | NF | 34.27 |
| 2143_1:2_F3 | >400 | 106 | 8H | 94.08 | NF | 31.03 |
| 2432_1:2_F0 | >400 | 111 | 7H | 78.40 | NF | 52.20 |
| 2432_1:2_F1 | >400 | 94 | 5H | 74.48 | NF | 28.20 |
| 2432_1:2_F2 | >400 | 84 | 2H | >160 | NF | 47.53 |
| 2432_1:2_F3 | 160 | 79 | HB | 156.8 | NF | 48.80 |
| 2634_1:2_F0 | >400 | 77 | 5H | >160 | NF | 12.83 |
| 2634_1:2_F1 | >400 | 79 | 2H | >160 | NF | 6.83 |
| 2634_1:2_F2 | >400 | 107 | 3H | 137.20 | NF | 7.53 |
| 2634_1:2_F3 | >400 | 78 | 5H | 117.60 | NF | 5.97 |
| 2767_1:2_F0 | >400 | 84 | 2H | 94.08 | NF | 59.47 |
| 2767_1:2_F1 | 200 | 86 | 2H | >160 | NF | 28.63 |
| 2767_1:2_F2 | 220 | 81 | H | 156.80 | NF | 35.90 |
| 2767_1:2_F3 | 180 | 77 | H | 23.52 | NF | 20.53 |

$^a$NF indicates no failure in the film after experiment.

From Table 3, results showed that all coatings cured completely, except 2432_1:2_F3, 2767_1:2_F1, 2767_1:2_F2, and 2767_1:2_F3. As compared to coatings with epoxy:amine hydrogen ratio of 1:1, increasing amine content caused increase in hardness values. Impact strength values also improved slightly for coatings cured with polyamines. Again, all coatings cured using polyamines and polyamides appeared non-glossy with a non-uniform surface. On the other hand, coatings with PACM showed slight increase in pendulum and pencil hardness and surface gloss. The coatings with PACM possessed smooth, almost transparent uniform surface.

TABLE 4

Results for coatings with epoxy:amine hydrogen ratio of 2:1.

| Coatings | MEK Double Rubs | König Pendulum (s) | Pencil Hardness | Impact (in-lbs) | $^a$Mandrel Bend | Gloss at 60° |
|---|---|---|---|---|---|---|
| PACM_2:1_F0 | >400 | 44 | 4B | 133.28 | NF | 97.27 |
| PACM_2:1_F1 | >400 | 47 | 4B | 137.20 | NF | 86.83 |
| PACM_2:1_F2 | 140 | 41 | 5B | 141.12 | NF | 86.53 |
| PACM_2:1_F3 | >400 | 41 | 5B | >160 | NF | 74.97 |
| 2143_2:1_F0 | >400 | 34 | 8B | 86.24 | NF | 54.03 |
| 2143_2:1_F1 | 158 | 32 | 8B | 47.04 | NF | 49.53 |

TABLE 4-continued

Results for coatings with epoxy:amine hydrogen ratio of 2:1.

| Coatings | MEK Double Rubs | König Pendulum (s) | Pencil Hardness | Impact (in-lbs) | [a]Mandrel Bend | Gloss at 60° |
|---|---|---|---|---|---|---|
| 2143_2:1_F2 | >400 | 31 | 8B | 39.20 | NF | 43.83 |
| 2143_2:1_F3 | >400 | 34 | 8B | 23.52 | NF | 44.30 |
| 2432_2:1_F0 | 250 | 29 | 8B | 109.76 | NF | 83.73 |
| 2432_2:1_F1 | >400 | 30 | 8B | 141.12 | NF | 46.87 |
| 2432_2:1_F2 | >400 | 35 | 8B | 86.24 | NF | 49.07 |
| 2432_2:1_F3 | 160 | 40 | 8B | 152.88 | NF | 54.13 |
| 2634_2:1_F0 | 80 | 45 | HB | 156.80 | NF | 74.40 |
| 2634_2:1_F1 | 320 | 46 | HB | 152.88 | NF | 66.47 |
| 2634_2:1_F2 | 220 | 49 | B | >160 | NF | 58.70 |
| 2634_2:1_F3 | 180 | 46 | B | >160 | NF | 47.17 |
| 2767_2:1_F0 | 300 | 81 | 2H | 23.52 | 1 cm tear | 79.77 |
| 2767_2:1_F1 | 300 | 73 | 2H | 11.76 | 1 cm tear | 73.97 |
| 2767_2:1_F2 | 100 | 76 | H | 23.52 | 1 cm tear | 71.50 |
| 2767_2:1_F3 | 80 | 73 | F | 11.76 | NF | 66.57 |

[a]NF indicates no failure in the film after experiment.

From Table 4, half of the formulations did not cure completely. All coatings were soft or elastomeric to touch. Due to the incomplete formation of networks, the coatings showed comparatively lower impact strength values. All the coatings, including coatings with PACM, appeared non-uniform. Based on the results obtained, curing coatings using low baking conditions resulted in better compatibilizing all the phases in the coating formulations, especially PDMS. Higher compatibility results in smoother appearance of coatings. In decreasing order of performance, PACM>polyamines>>polyamides.

FIGS. 3(a)-3(f) show results for hardness, impact strength, and gloss for PACM and Ancamine coatings that showed MEK double rubs values greater than 400, some of which were also described above in Tables 2-4. MEK double rub values for PACM_1:2_Fx coatings above 10% APT-PDMS dropped significantly. Moreover, irreproducible coatings were achieved for the polyamine cured formulations above 4% APT-PDMS content. Conical mandrel bend test showed that the cured coatings were flexible and did not show any delamination or tear of the coating film. From FIGS. 3(a) and (b) it can be seen that hardness of the PACM cured and the Ancamine 2432 cured coatings increased with increase in the amount of the amine crosslinker. For the PACM cured coatings, the pendulum hardness values increased from 60-95 seconds for coatings with epoxy:amine hydrogen=1:1 to 75-105 seconds for coatings with epoxy:amine hydrogen=1:2. Similarly, increasing the amount of Ancamine 2432 crosslinker resulted in increase in hardness of the coatings from 65-85 seconds for 1:1 coatings to 80-105 seconds for 1:2 coatings. Unlike PACM and Ancamine 2432, hardness of the coatings with Ancamine 2143 decreased slightly with higher amount of the crosslinker. Hardness of PACM_1:1_Fx, PACM_1:2_Fx, and 2432_1:2_Fx coatings decreased with increasing % APT-PDMS in the formulations up to 3%, while an increase in hardness values was observed for 2143_1:1_Fx, 2143_1:2_Fx, and 2432_1:1_Fx formulations. For all the coatings, irrespective of the amine crosslinker and the ratio of epoxy:amine hydrogen, the formulations with the 4% APT-PDMS content exhibited highest pendulum hardness.

Figure 3A:
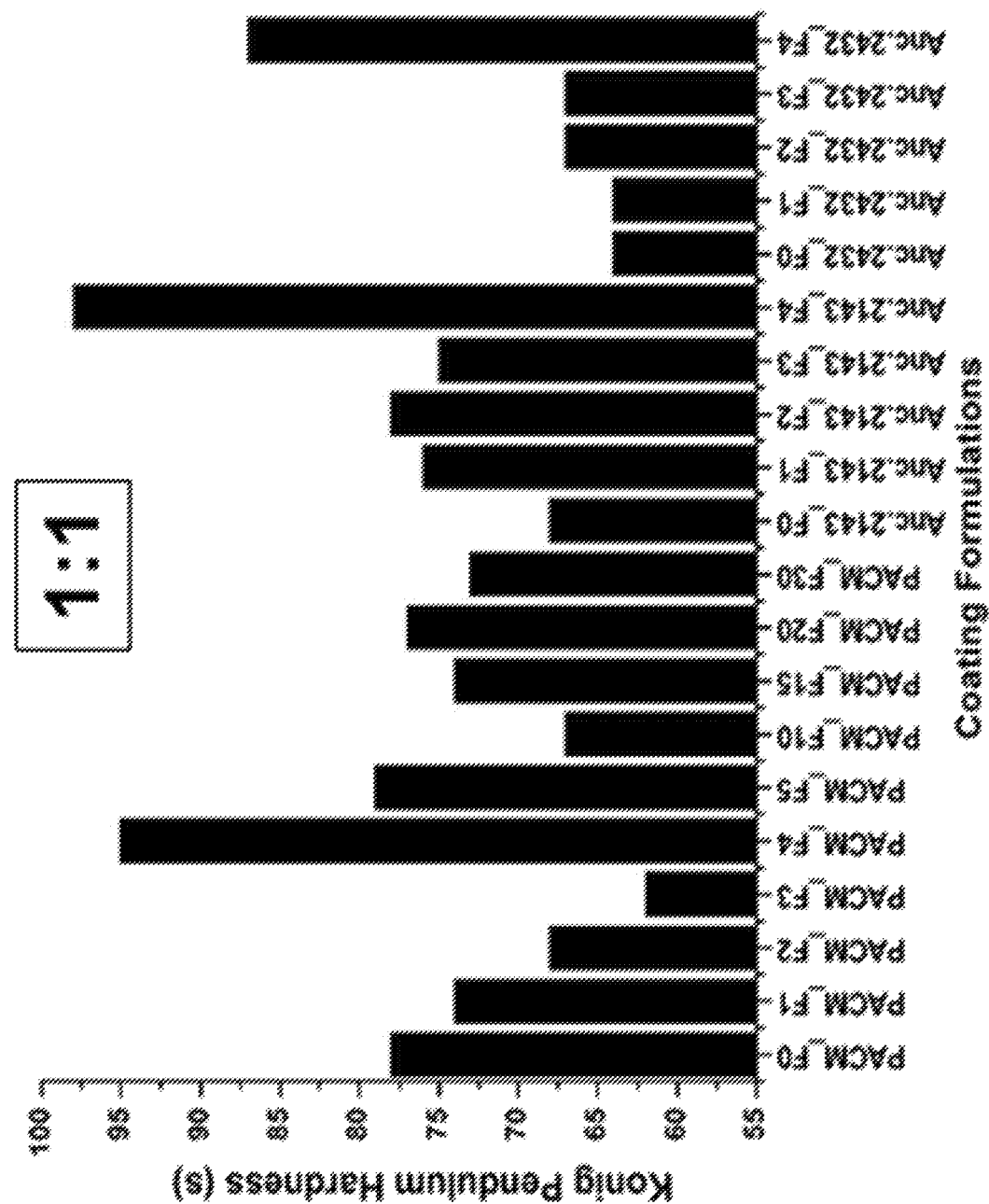
FIG. 3(a) shows the König pendulum hardness for coatings of the invention with epoxy:amine hydrogen=1:1.
Figure 3B:
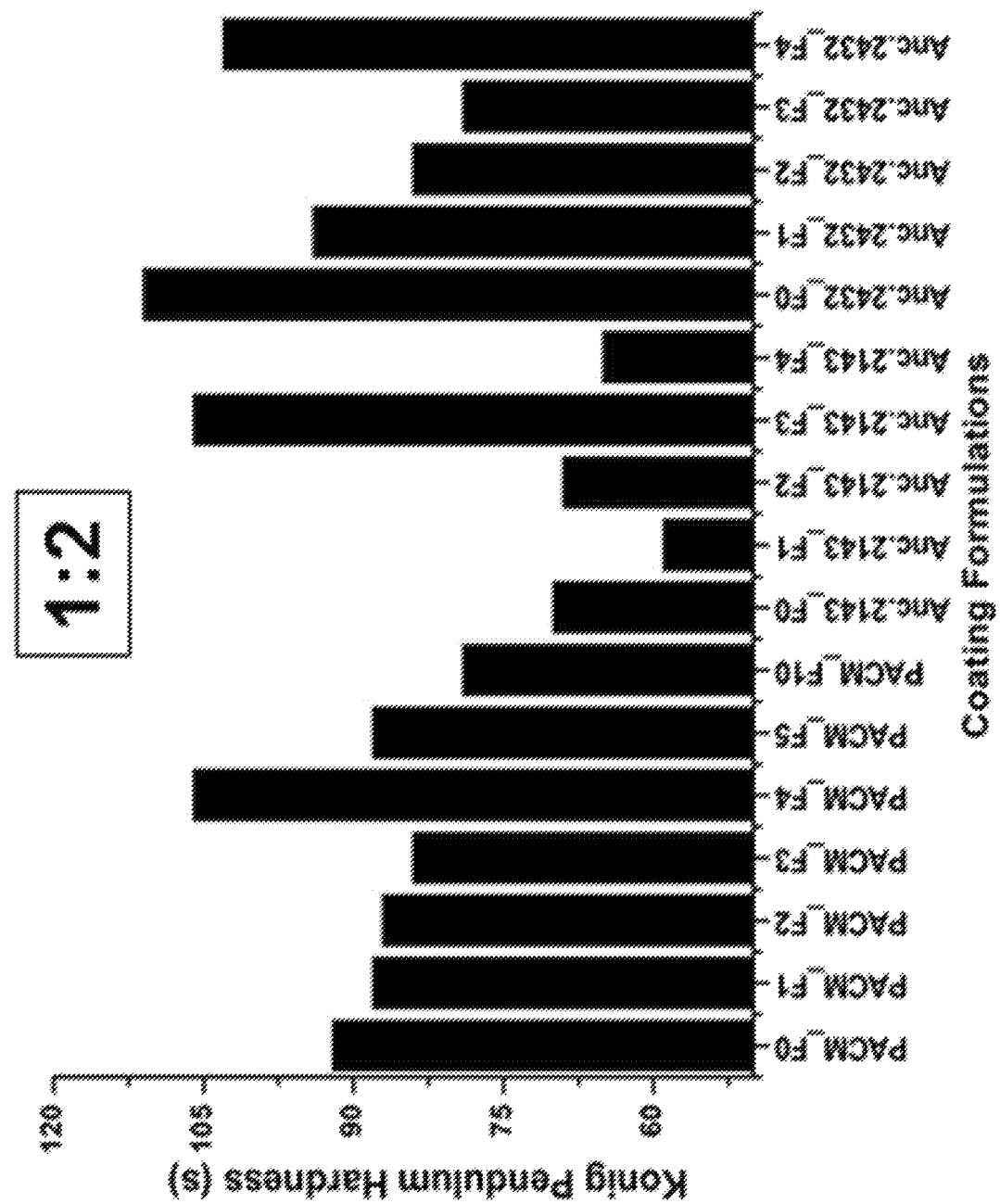
FIG. 3(b) shows the König pendulum hardness for coatings of the invention with epoxy:amine hydrogen=1:2.
Figure 3C:
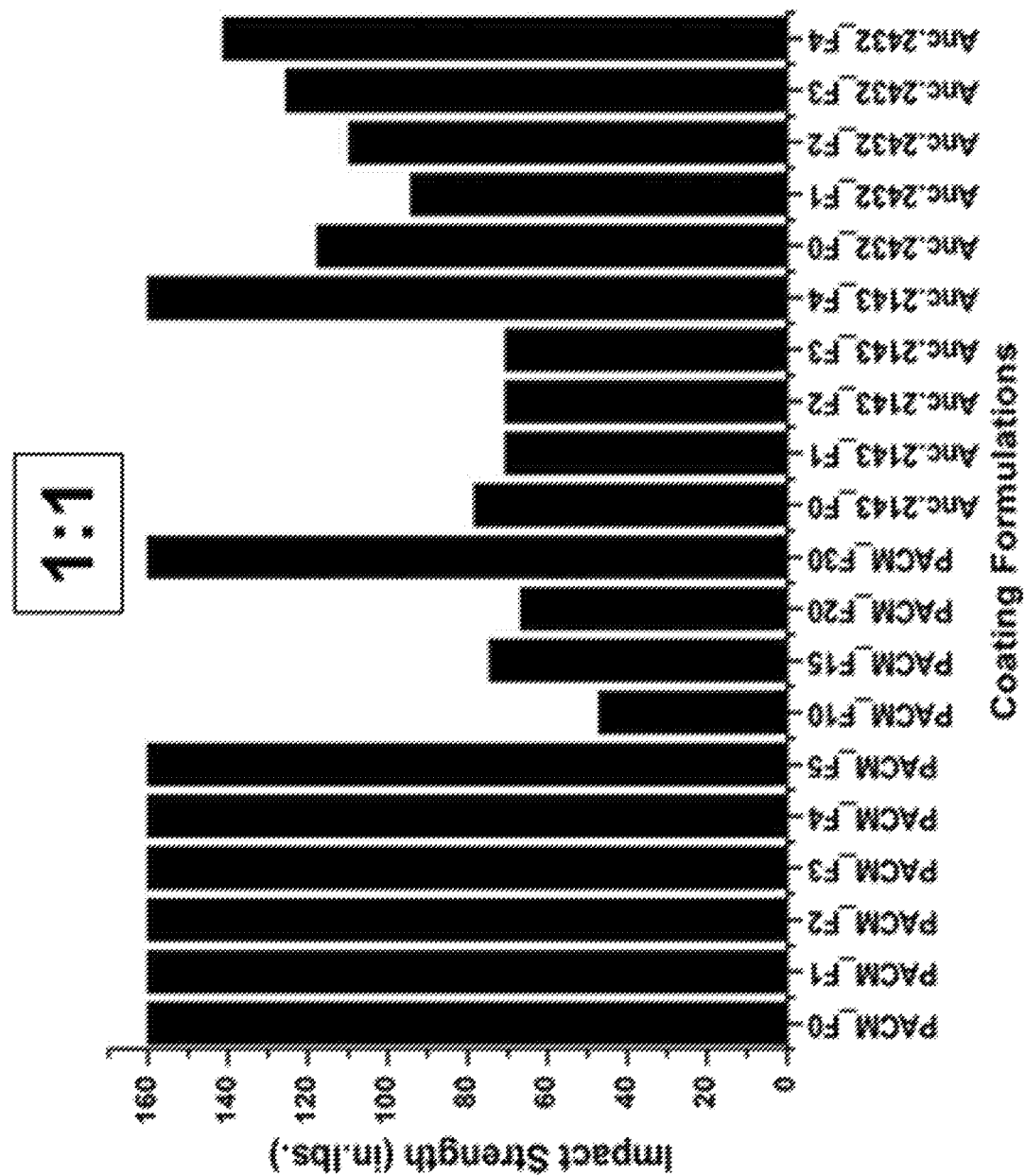
FIG. 3(c) shows the reverse impact strength for coatings of the invention with epoxy:amine hydrogen=1:1.
Figure 3D:
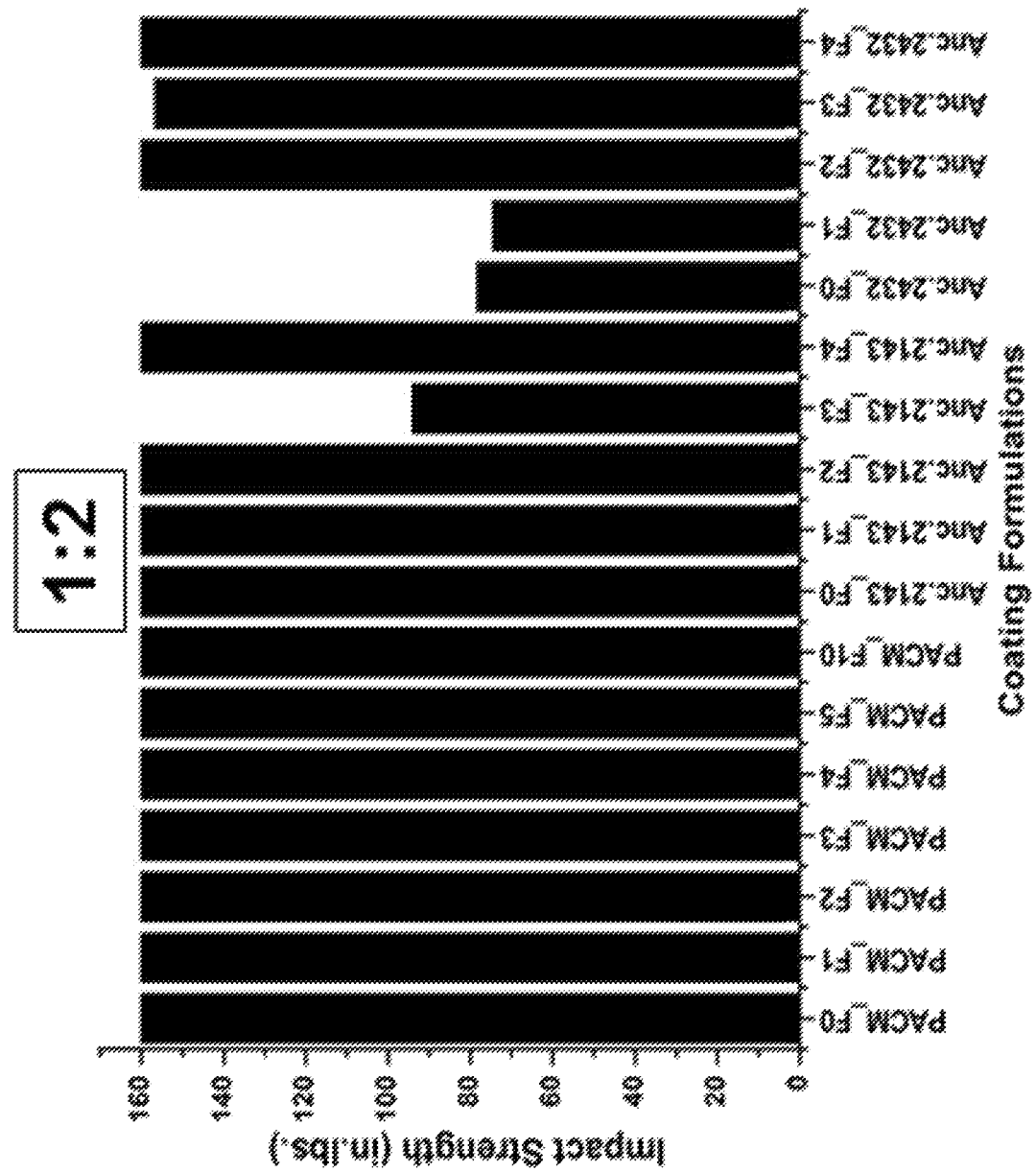
FIG. 3(d) shows the reverse impact strength for coatings of the invention with epoxy:amine hydrogen=1:2.

FIGS. 3(c) and (d) show reverse impact strength of selected cured coatings. Overall, the impact strength of the coatings improved with higher amount of the amine crosslinker. For coatings with epoxy:amine hydrogen=1:1, the impact strength of PACM cured coatings dropped for % APT-PDMS between 5-30%. Compared to the PACM-cured coatings, the formulations cured using the two polyamines showed lower impact strength values. For the formulations cured using the polyamines, the impact strength of the coatings improved with increase in % APT-PDMS content. For coatings with epoxy:amine hydrogen=1:2, most of the cured formulations showed impact strength >160 in-lbs., except 2143_1:2_F3, 2432_1:2_F0, and 2432_1:2_F2.

Figure 3E:
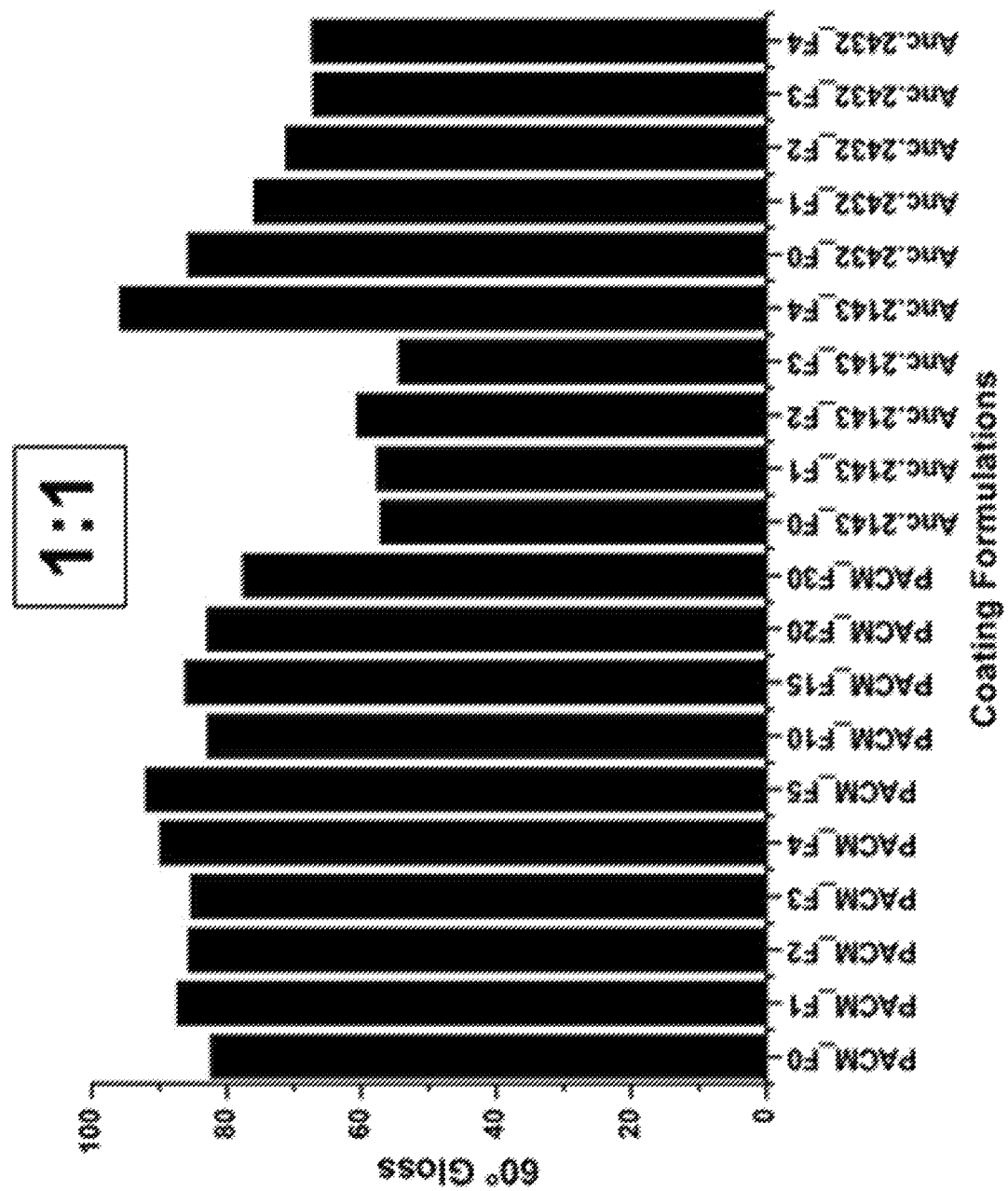
FIG. 3(e) shows the 60° gloss values for coatings of the invention with epoxy:amine hydrogen=1:1.
Figure 3F:
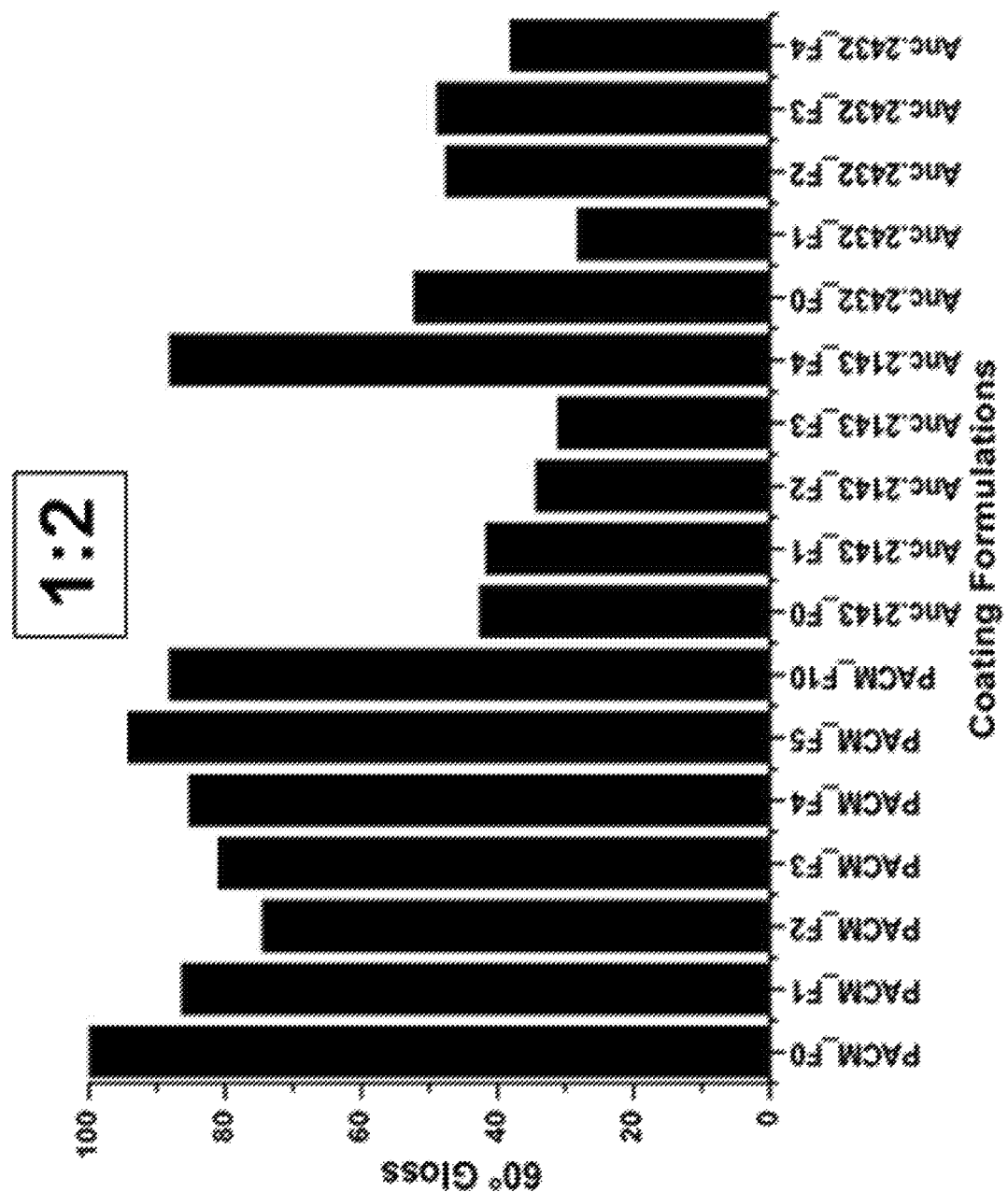
FIG. 3(f) shows the 60° gloss values for coatings of the invention with epoxy:amine hydrogen=1:2.
Figure 4A:
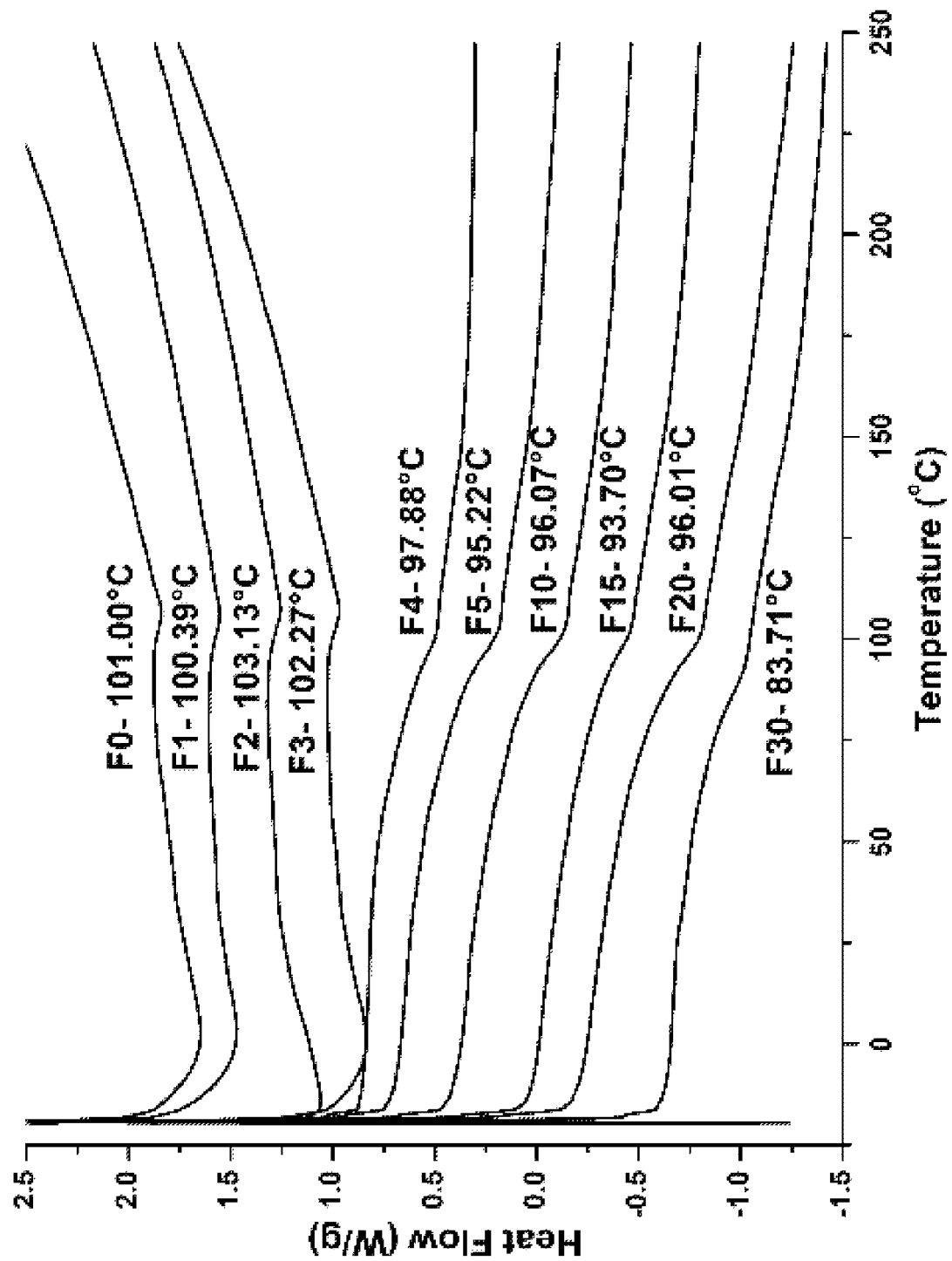
FIG. 4(a) shows Differential Scanning calorimetry (DSC) scans for PACM_1:1_Fx coatings of the invention.
Figure 4B:
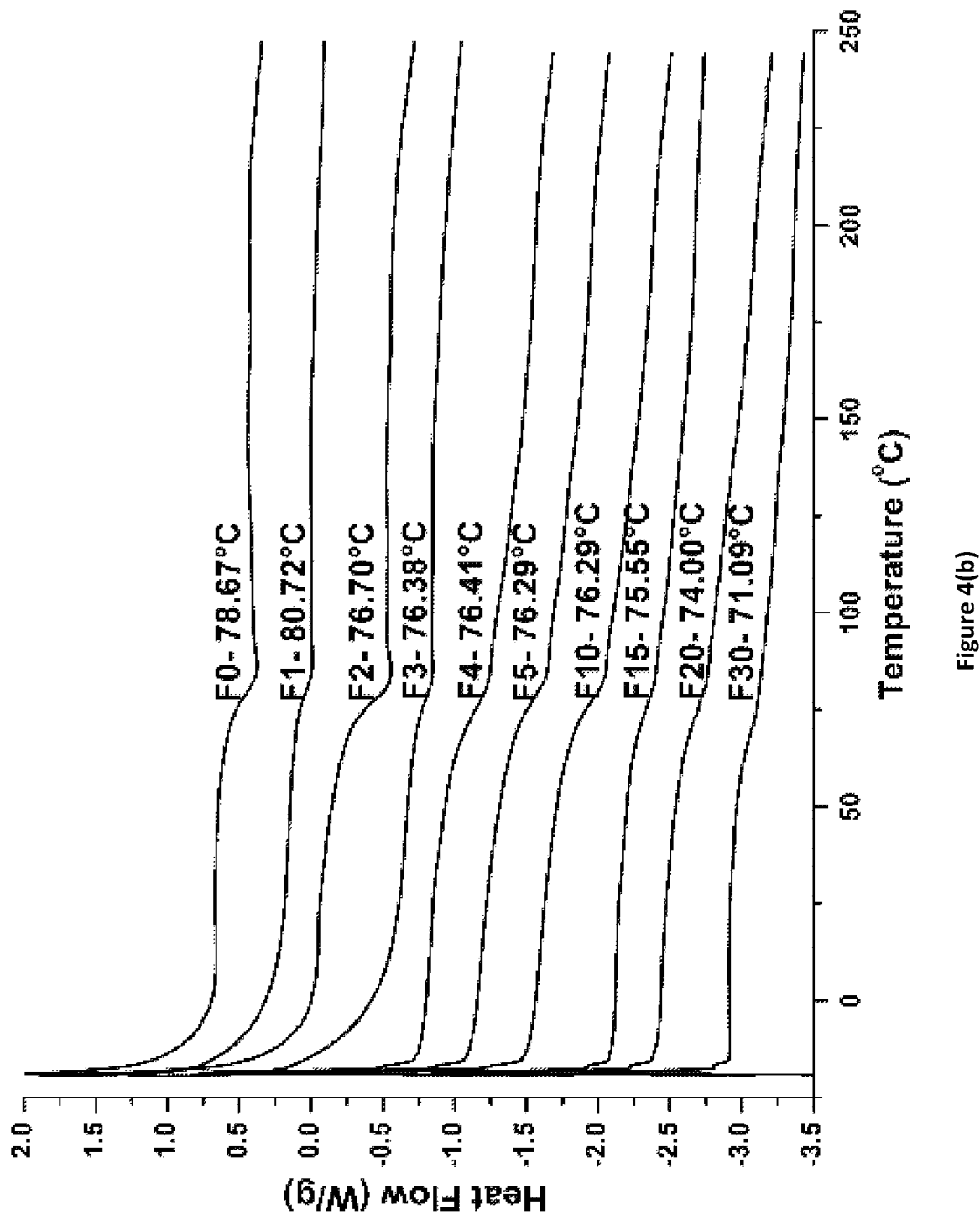
FIG. 4(b) shows DSC scans for PACM_1:2_Fx coatings of the invention.
Figure 4C:
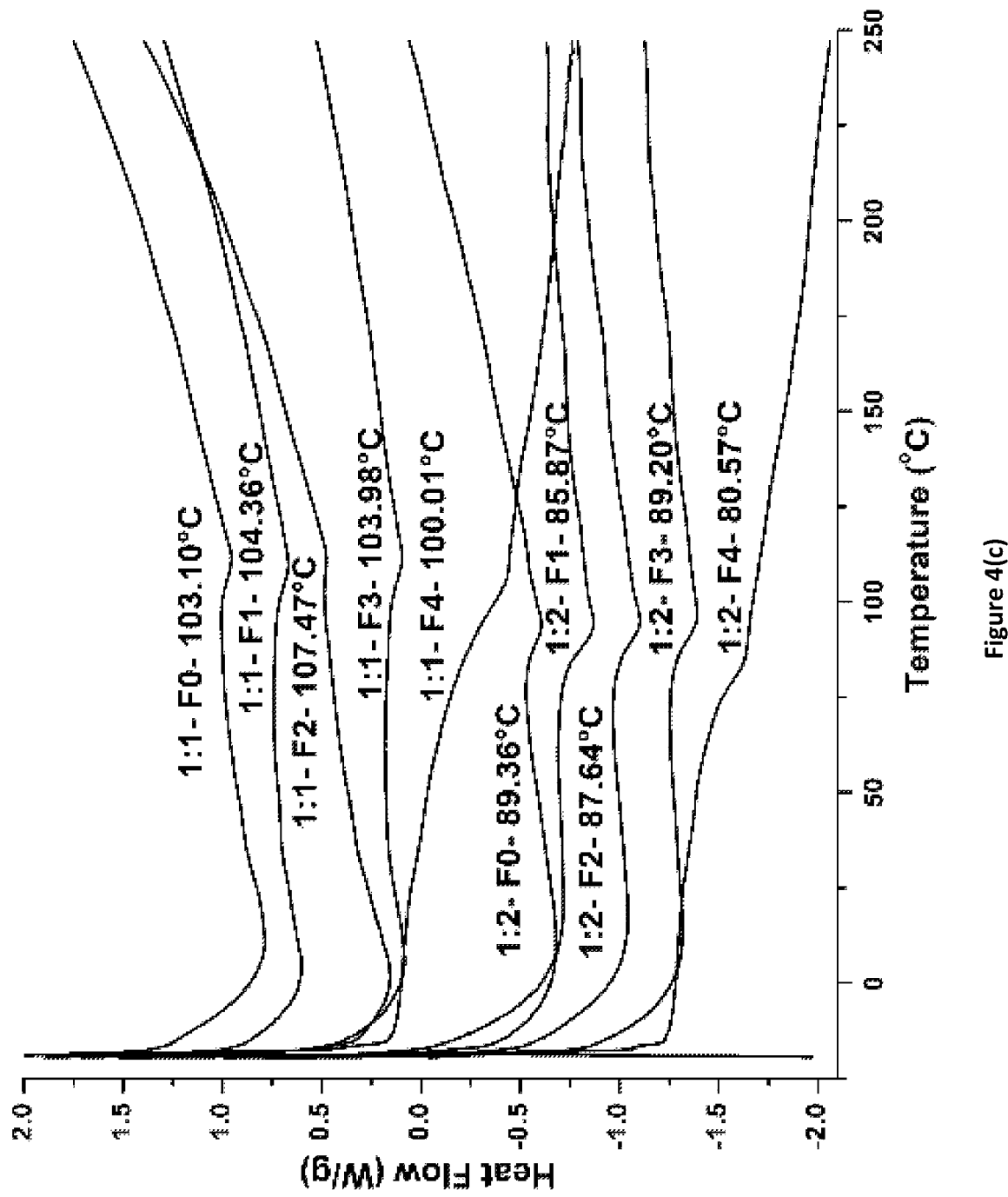
FIG. 4(c) shows DSC scans for Ancamine® 2143_Fx coatings of the invention.
Figure 4D:
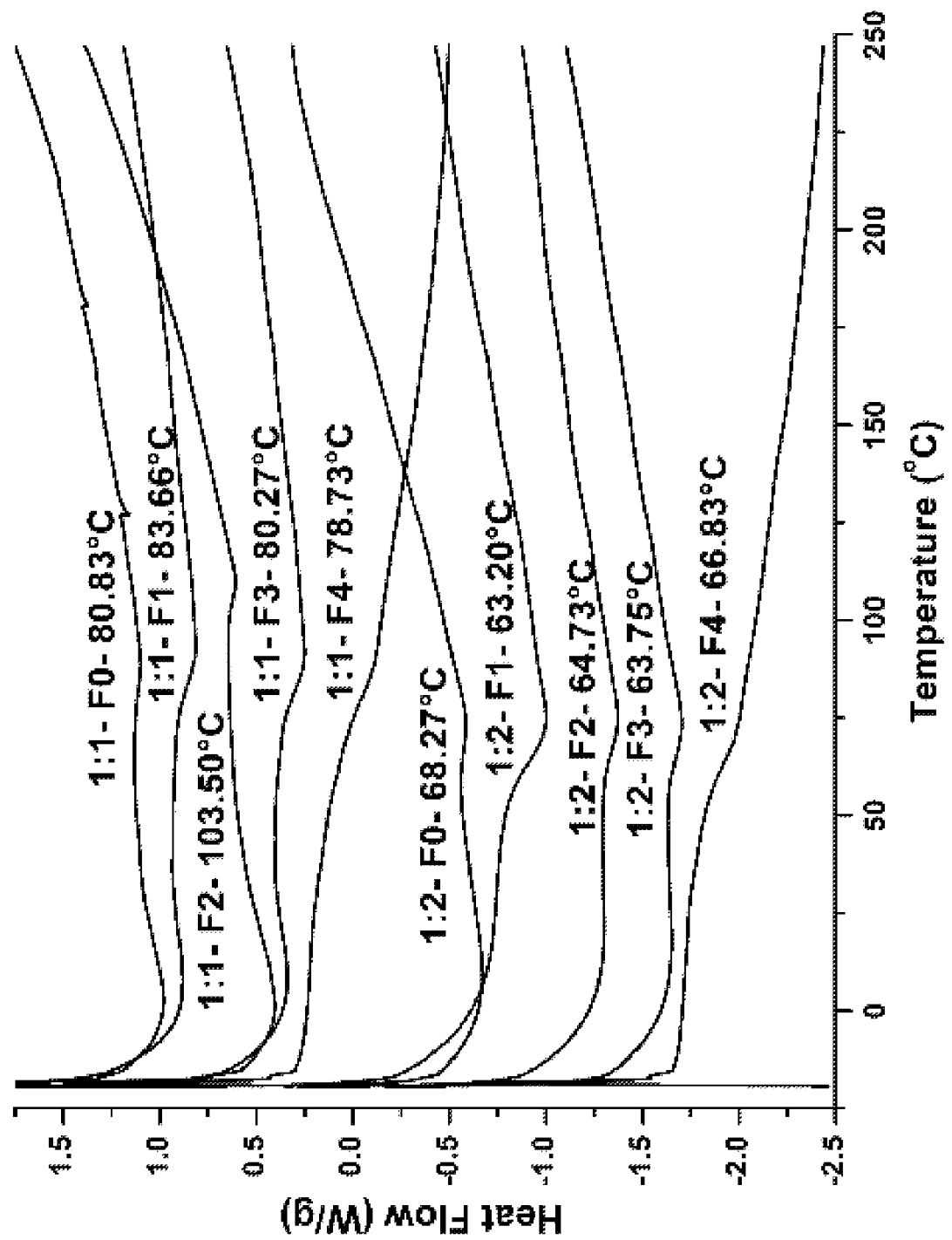
FIG. 4(d) shows DSC scans for Ancamine® 2432_Fx coatings of the invention.
Figure 5A:
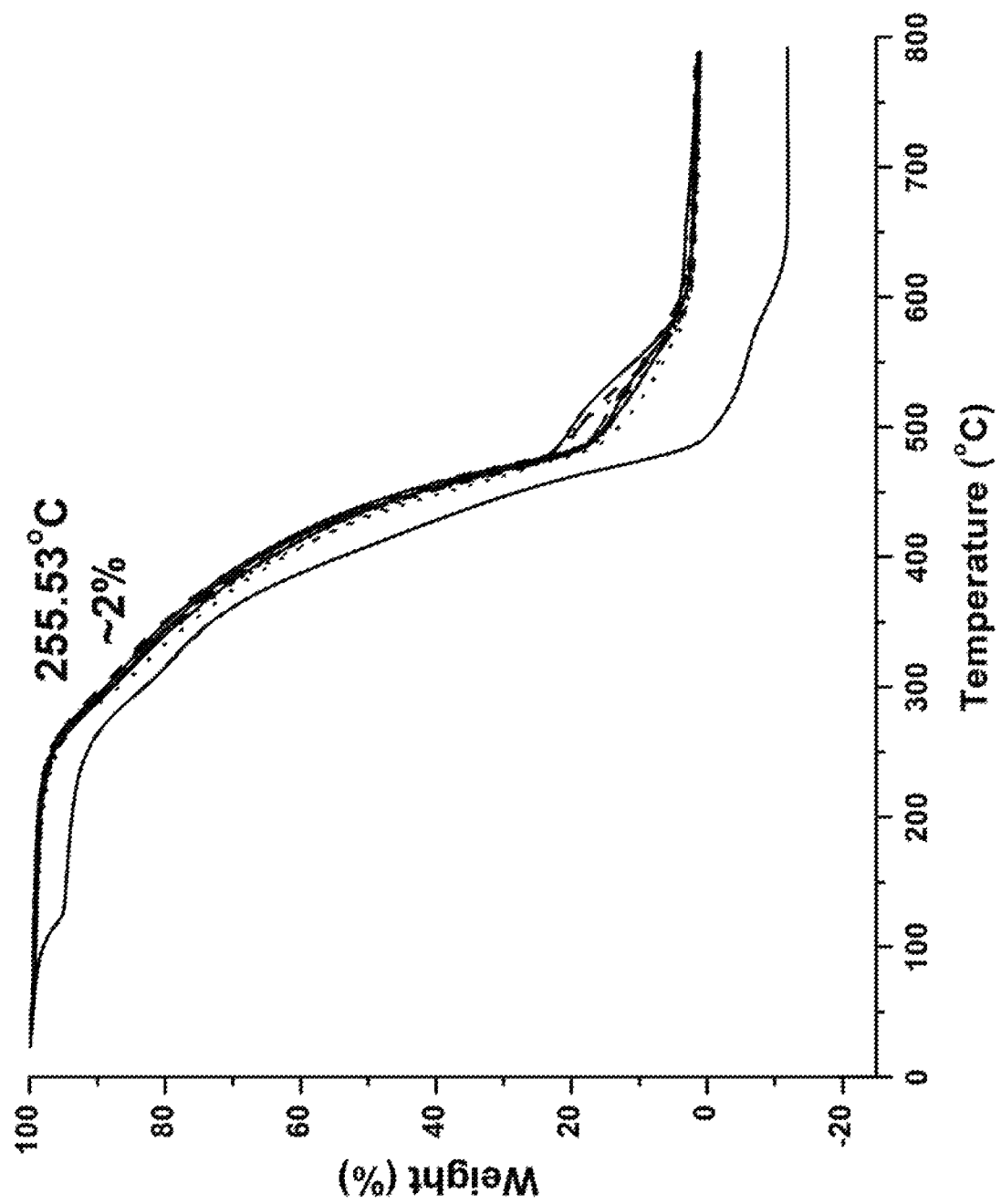
FIG. 5(a) shows degradation behavior and initial weight loss in percentage for PACM_1:1_Fx coatings of the invention.
Figure 5B:
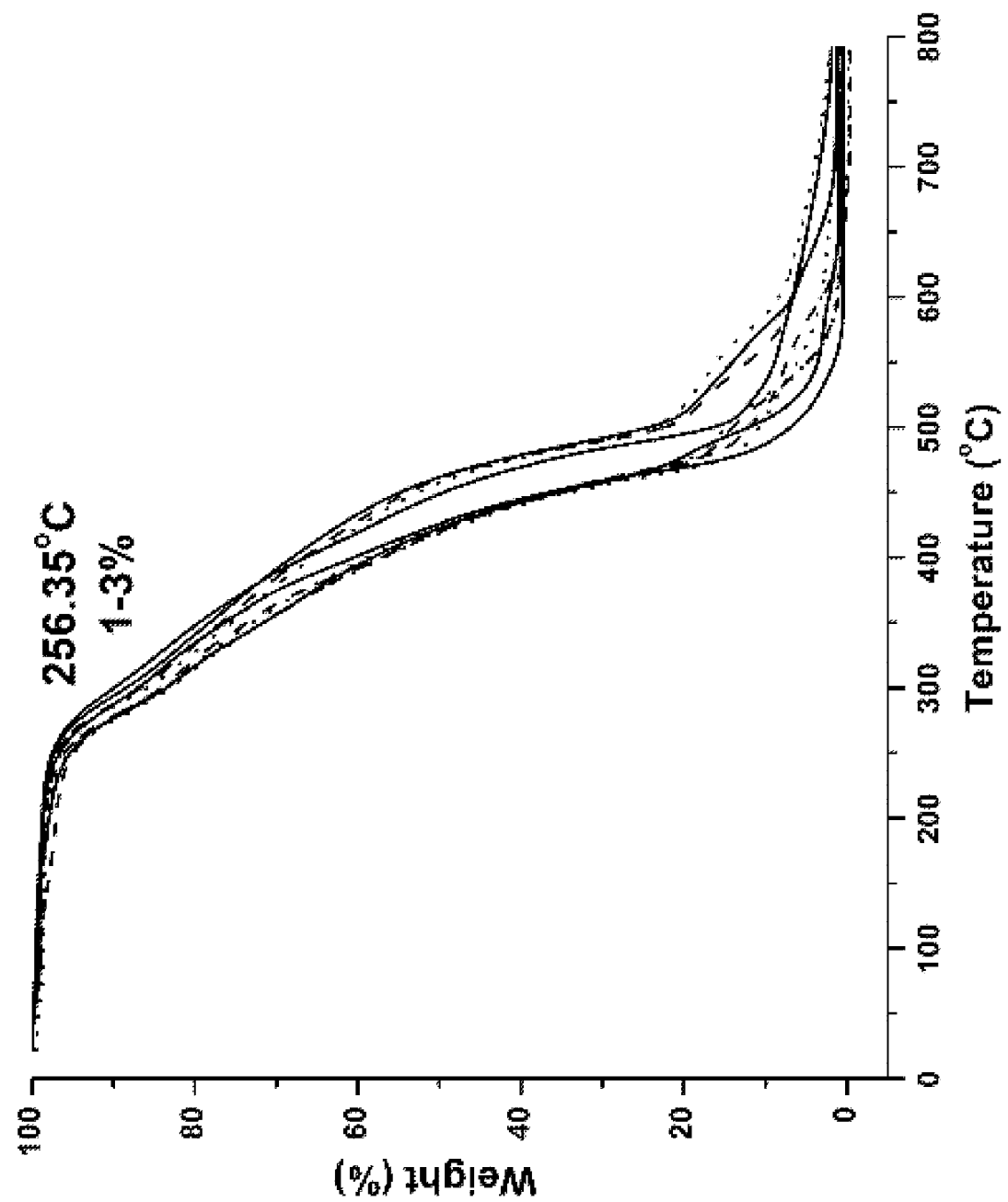
FIG. 5(b) shows degradation behavior and initial weight loss in percentage for PACM_1:2_Fx coatings of the invention.
Figure 5C:
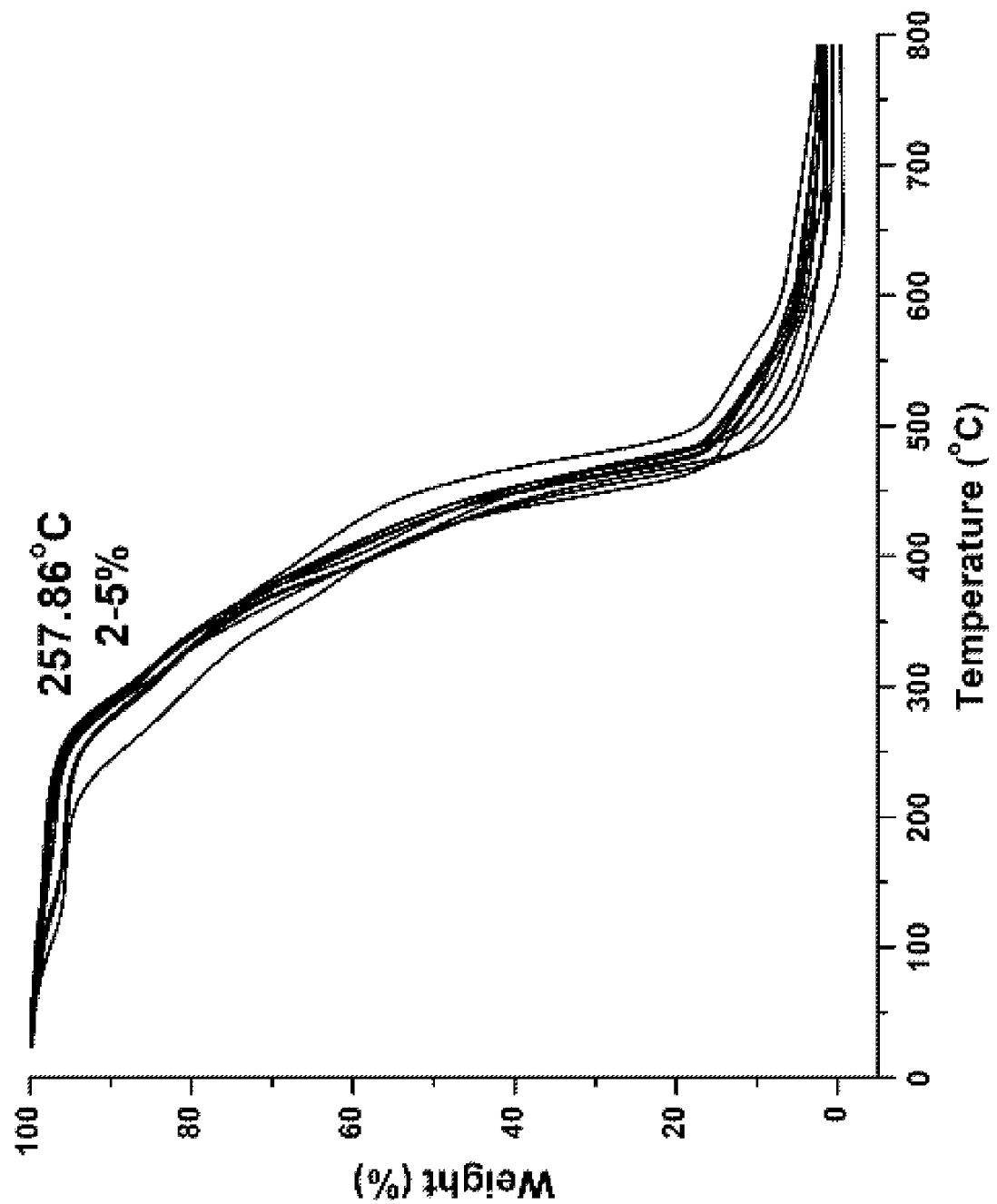
FIG. 5(c) shows degradation behavior and initial weight loss in percentage for Ancamine® 2143_Fx coatings of the invention.
Figure 5D:
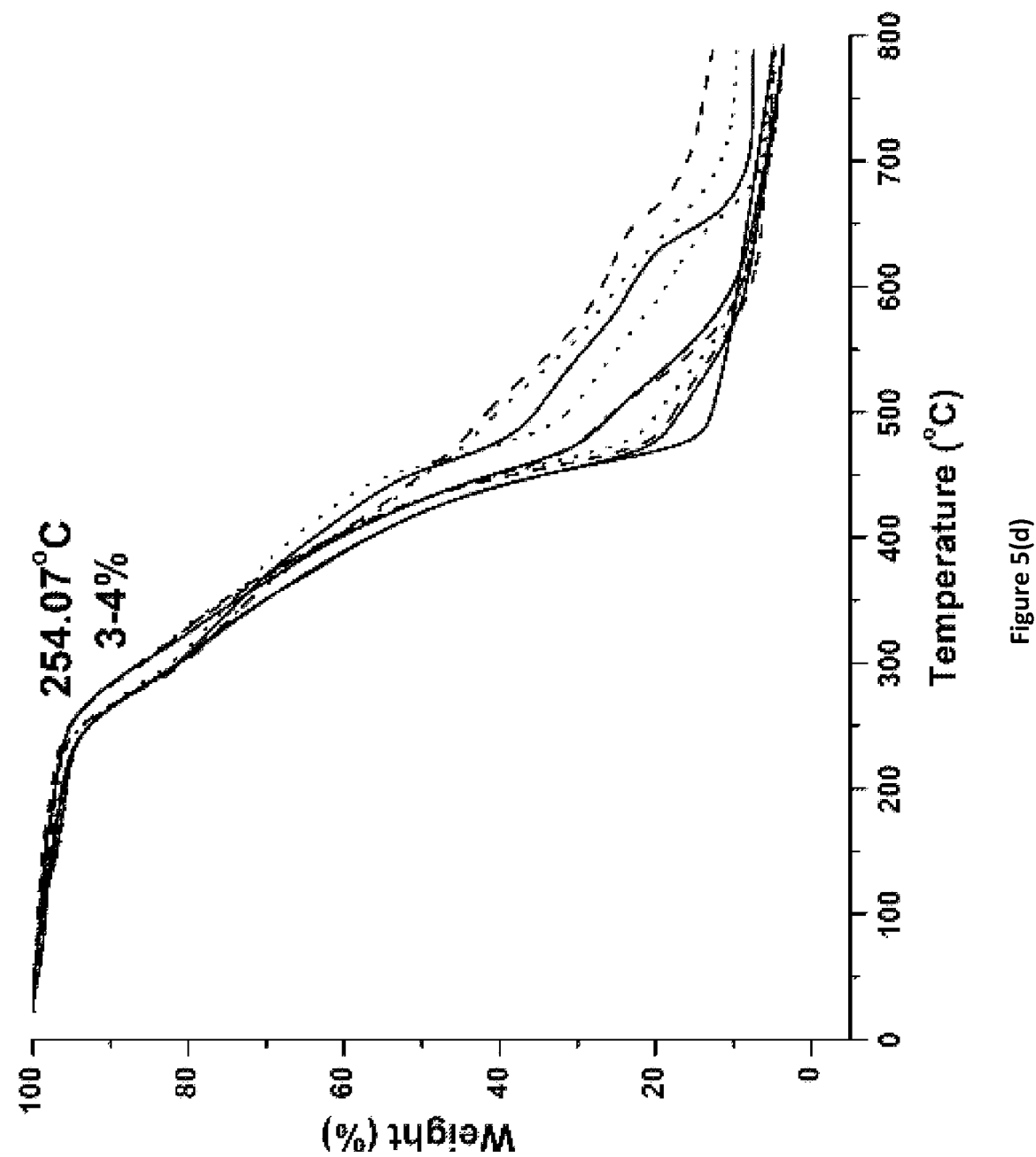
FIG. 5(d) shows degradation behavior and initial weight loss in percentage for Ancamine® 2432_Fx coatings of the invention.

FIGS. 3(e) and (f) show 60° gloss values for the cured coatings. In general, the PACM cured coatings appeared glossier than the coatings cured using the polyamines. PACM_1:2_Fx coatings exhibited slightly higher 60° gloss values as compared to PACM_1:1_Fx formulations. Conversely, increasing amount of polyamine content in the formulations resulted in decrease in the gloss of the polyamine cured coatings. Increasing the amount of the amine crosslinker may have resulted in the formation of a loose coating network. The soft siloxane component may have remained "embedded" within the network, causing the outer surface to comprise of the GC matrix. Lower concentration of the PDMS component on the surface may have caused the lowering of the surface gloss with increasing amine content of the coatings. A loose network will also allow more movement of the chains, thereby increasing the ability of the coating film to withstand impact. Therefore, coatings with epoxy:amine hydrogen=1:2 exhibited higher hardness values and improved impact strength values.

Selected cured coatings were analyzed by DSC to determine their glass transition temperatures ($T_g$° C.). FIGS. 4(a)-(d) show DSC scans for coatings cured using PACM, Ancamine 2143, and Ancamine 2432. In general, coatings with epoxy:amine hydrogen=1:1 exhibited higher $T_g$ values as compared to coatings with 1:2 ratio. Among all coating formulations, 2143_1:1_Fx coatings showed highest $T_g$ values, ranging from 100° C. to 107° C., while 2432_1:2_Fx coatings exhibited lowest $T_g$ values in the range from 63° C. to 68° C. PACM_1:1_Fx coatings showed $T_g$ values in the range from 83° C. for 30% APT-PDMS to 103° C. for 2% APT-PDMS. For the PACM cured coatings, increasing % APT-PDMS content resulted in reduction in $T_g$ values (FIGS. 4(a) and 4(b)). For the polyamine cured coatings with epoxy:amine hydrogen=1:1 (FIGS. 4(c) and 4(d)), the $T_g$ values increased until 2% additional APT-PDMS content and then dropped with further addition of APT-PDMS.

FIGS. 5(a)-(d) show results for degradation behavior of the IGC_PDMS coatings as observed using TGA. PACM_1:1_Fx and PACM_1:2_Fx coatings showed similar degradation behavior (FIGS. 5(a) and 5(b)). For the PACM cured coatings, onset of degradation was observed at about 255° C. Initial weight loss between 1-3% may be attributed to the presence of residual solvent in the coatings after curing. Ancamine 2143_1:1_Fx and 2143_1:2_Fx coatings (FIG. 5(c)) showed onset of degradation at about 258° C., while the onset of degradation for all Ancamine 2432 cured coatings (FIG. 5(d)) occurred at 254° C. As compared to the PACM-cured coatings, the coatings cured using the two polyamines showed higher initial weight loss (2-5%). Since the polyamine cured coatings were allowed to crosslink at RT, higher amount of residual solvent may have been left in the coating films.

Figure 6A:
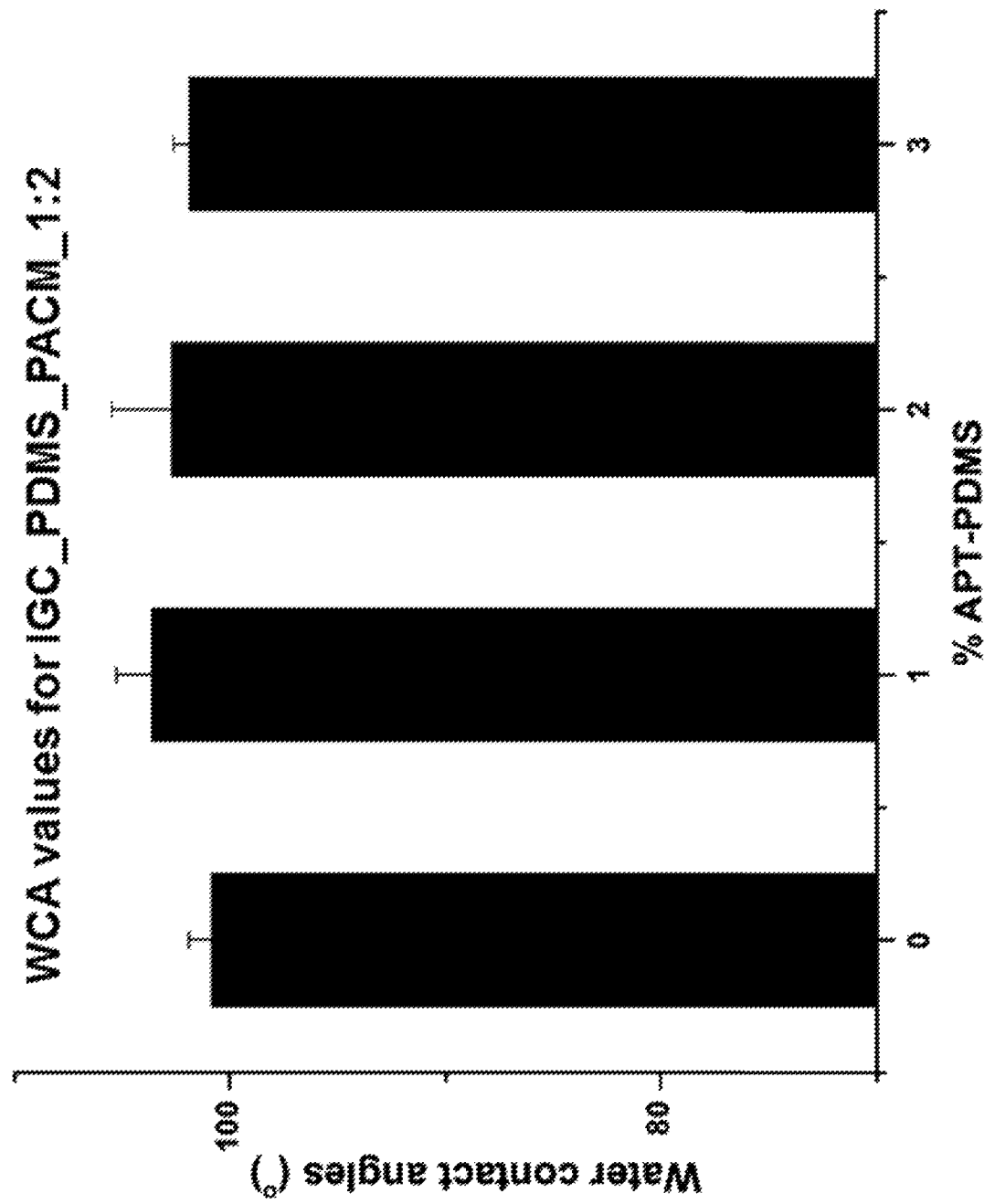
FIG. 6(a) shows the water contact angles for PACM_1:2_Fx coatings of the invention.
Figure 6B:
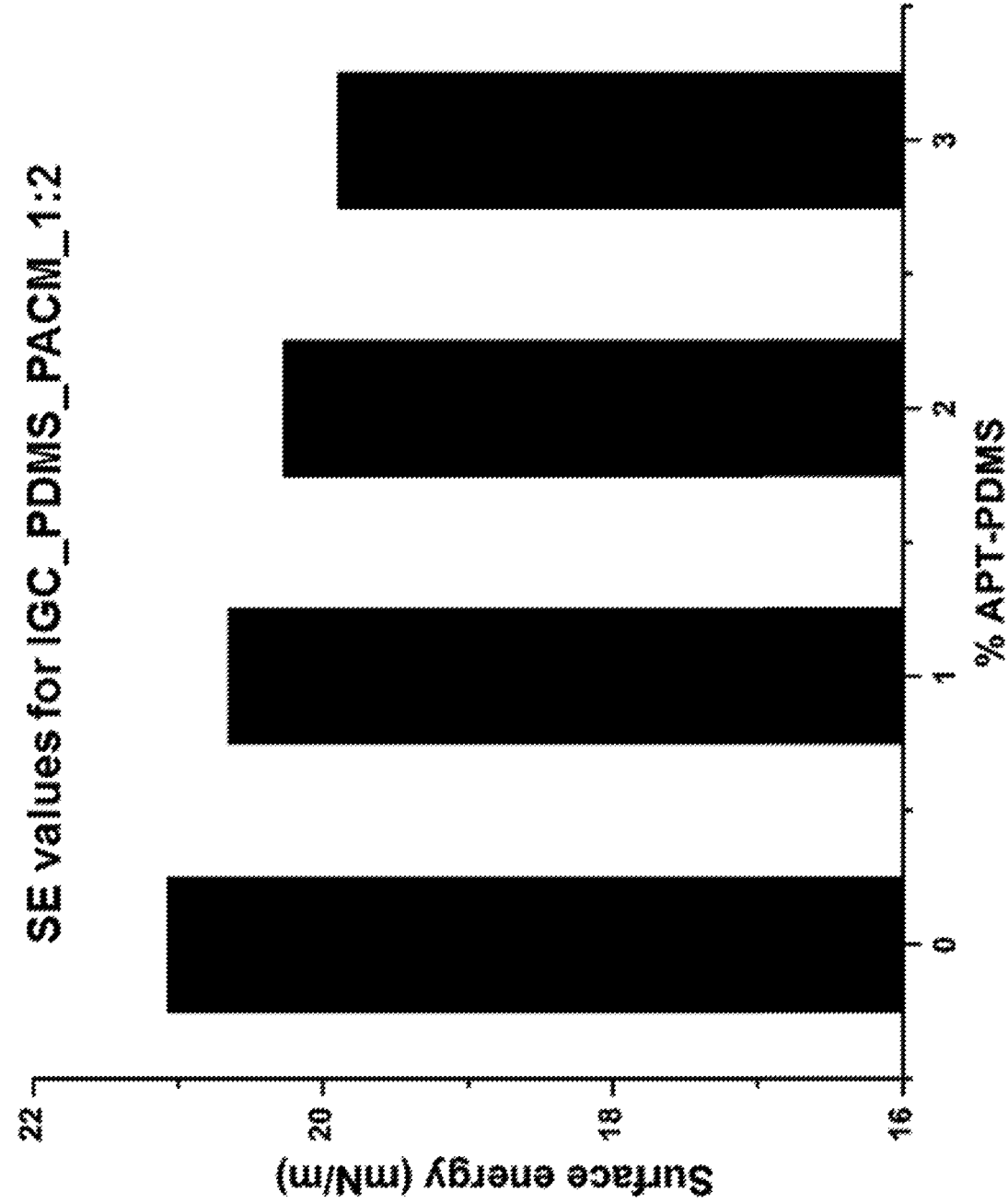
FIG. 6(b) shows the surface energy values for PACM_1:2_Fx coatings of the invention.
Figure 6C:
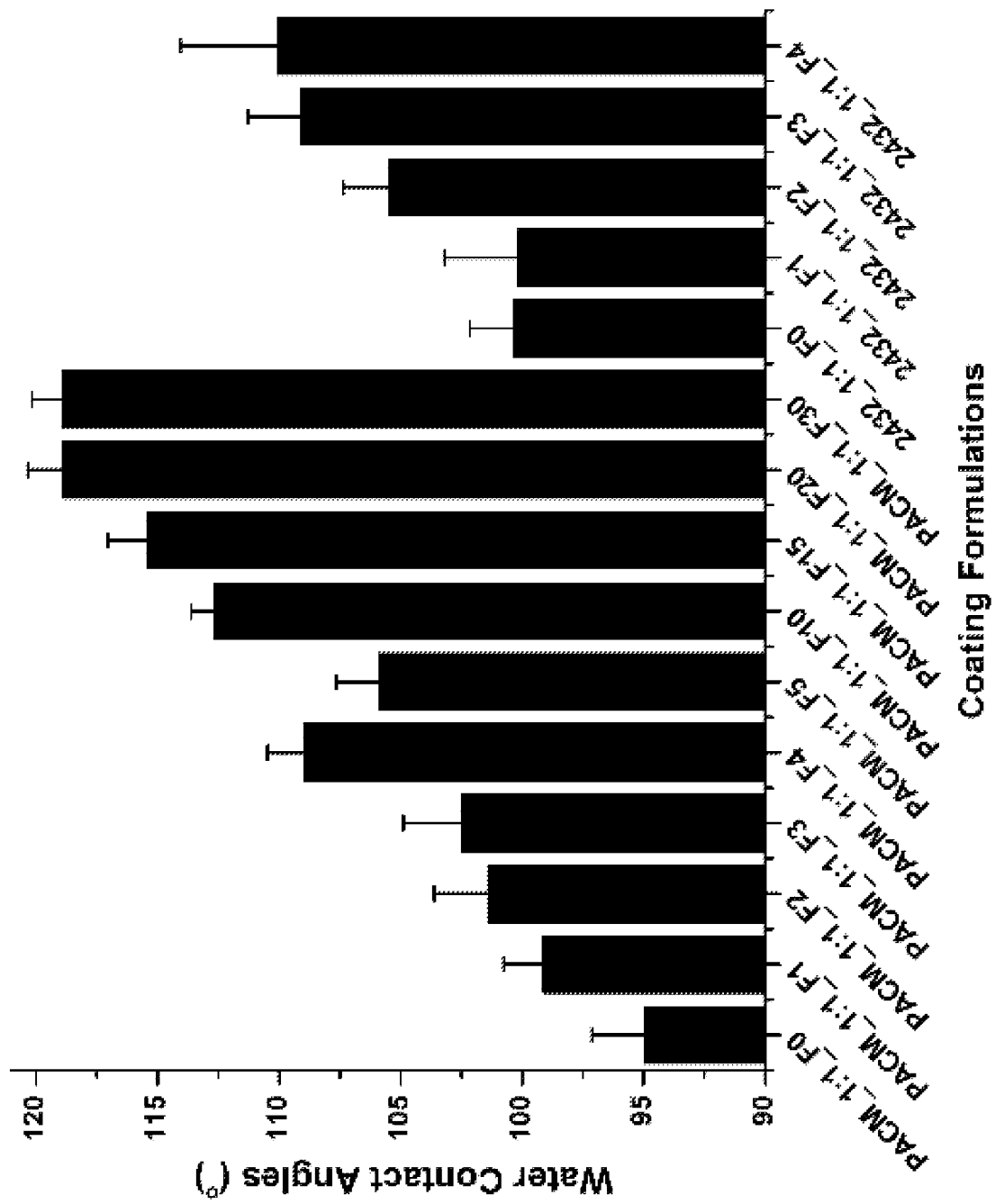
FIG. 6(c) shows the water contact angles for PACM_1:1_Fx and Ancamine® 2432_1:1_Fx coatings of the invention.
Figure 6D:
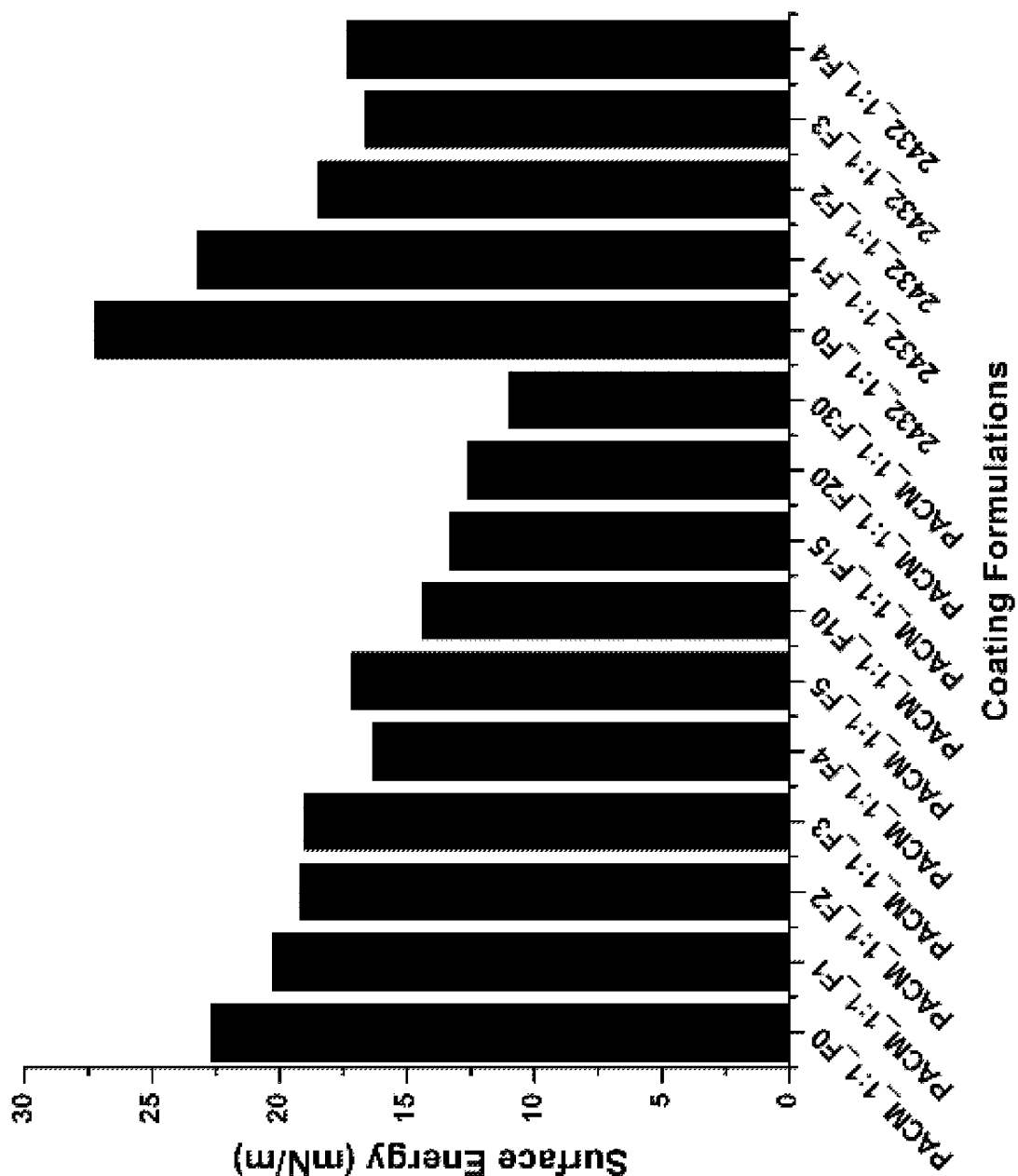
FIG. 6(d) shows the surface energy values for PACM_1:1_Fx and Ancamine® 2432_1:1_Fx coatings of the invention.

As discussed above, the siloxane-modified GC resins of the invention may be used as a non-toxic alternative to polyurethanes to make self-stratified coatings. One of the most commonly observed properties to understand fouling-release properties of a coating involve determining surface energy of the coating. Low surface energy coatings will result in slipping of fouling organism from the surface. Thus, marine applications desire surface energy values between 20-25 mN/m. Select PACM_1:1_Fx, PACM_1:2_Fx, and Ancamine 2432_1:1_Fx coatings of the invention were analyzed for their contact angle and surface energies. Non-uniformity of the surfaces of polyamine cured coatings resulted in contact angle values with large variations. FIGS. 6(a) and 6(b) show the water contact angle (WCA) and surface energy (SE) for select PACM_1:2_Fx coatings, and FIGS. 6(c) and 6(d) show the WCA and SE for the PACM_1:1_Fx and Ancamine 2432_1:1_Fx coatings. For all the coatings, WCA values are greater than 90°, indicating hydrophobicity and self-stratification of PDMS upon cure. Addition of additional APT-PDMS in the PACM_1:2_Fx coating formulations increases WCA by about 1-2°. SE values decrease upon addition of APT_PDMS to the PACM_1:2_Fx coatings. SE values decrease from 21 mN/m to 19 mN/m in the PACM_1:2_Fx coatings. Formation of a low surface energy surface indicates successful stratification of PDMS. PACM_1:1_F20 and PACM_1:1_F30 had the highest WCA value of 118°. SE of PACM_1:1_Fx lied in the range from 10.5-21 mN/m, with PACM_1:1_F30 exhibiting the lowest SE of 10.5 mN/m. Ancamine 2432_1:1_F3 and 2432_1:1_F4 exhibited the lowest SE of 16.3 mN/m and the highest WCA of 110°, respectively. Poor compatibility with the polar GC matrix and surface energy minimization are the two main causes of stratification of APT-PDMS. A uniform tightly bound coating network with PACM crosslinker may have forced APT-PDMS chains to form the outer low surface energy layer. On the other hand, a comparatively loose coating network with Ancamine 2432 may have caused APT-PDMS to remain "bound" within the network, thereby limiting the amount of PDMS stratifying to the outer layer.

Figure 7A:
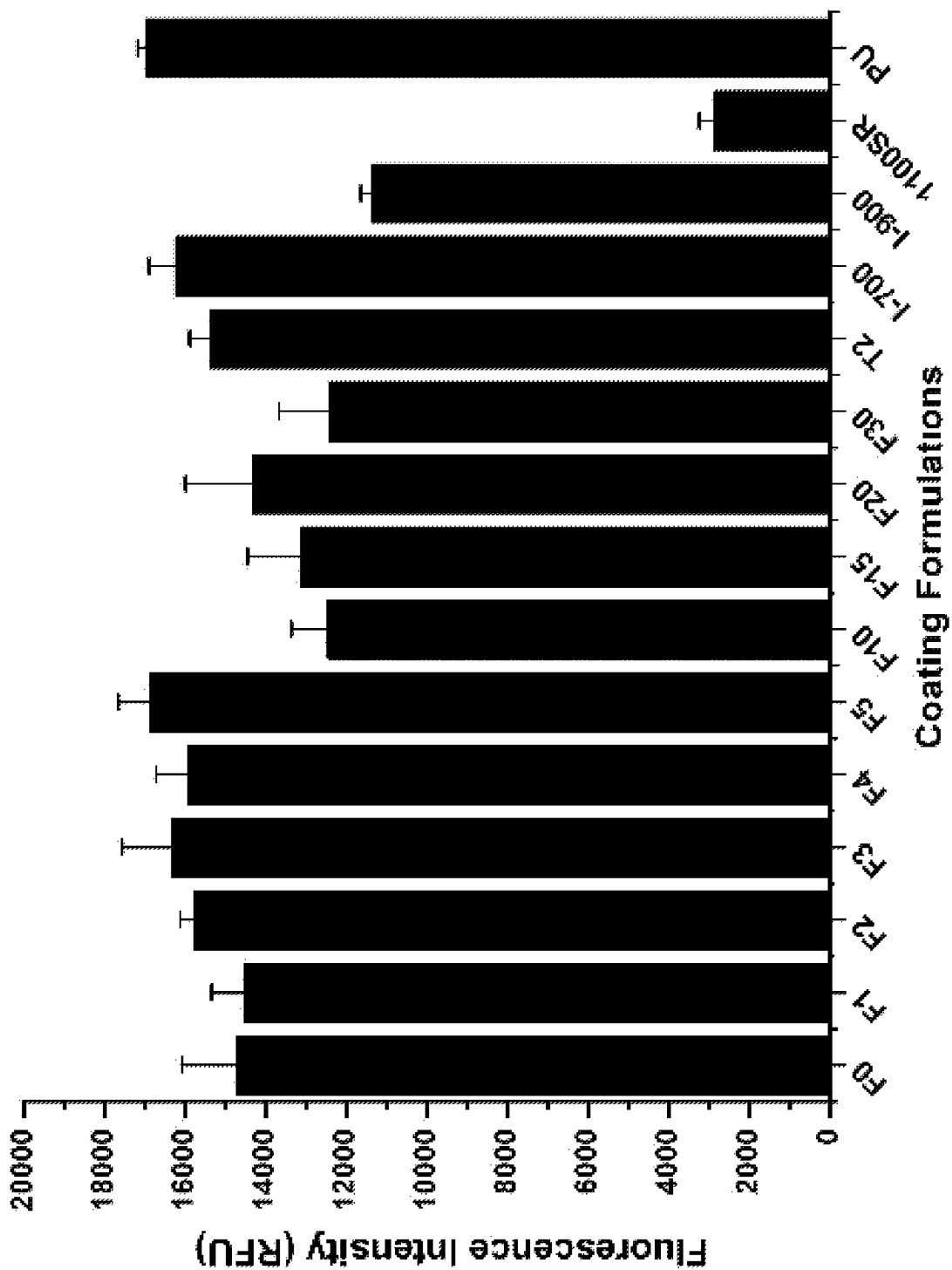
FIG. 7(a) shows the results for diatom *N. incerta* attachment for PACM_1:1_Fx coatings of the invention. Coating labels are of the format F % APT-PDMS.
Figure 7B:
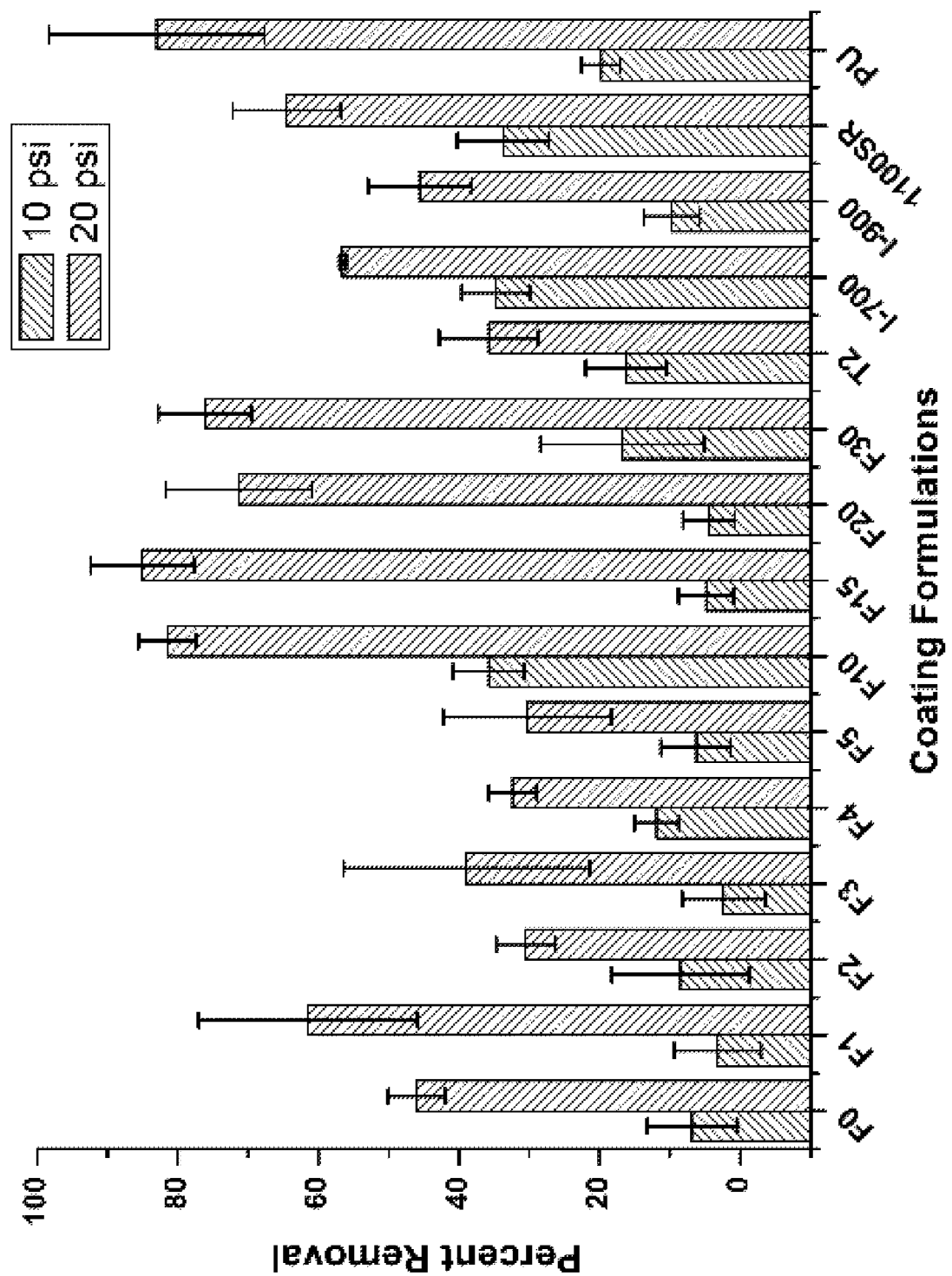
FIG. 7(b) shows the results for diatom *N. incerta* removal at 10 psi and 20 psi water jet pressures from PACM_1:1_Fx coatings of the invention. Coating labels are of the format F % APT-PDMS.

FIGS. 7(a) and 7(b) show the results for diatom *N. incerta* attachment and removal from PACM_1:1_Fx coatings. Performance of PACM_1:1_Fx coatings was compared to the commercially available Silastic T2, Intersleek 700, Intersleek 900, Intersleek 1100SR, and regular polyurethanes (no siloxane) coatings. The amount of *N. incerta* attached onto PACM_1:1_Fx coatings (FIG. 7(a)) was significantly higher than Intersleek 900 and Intersleek 1100SR coatings. PACM_1:1_Fx coatings showed attachment similar to regular polyurethane coatings, Silastic T2, and Intersleek 700 coatings. *N. incerta* attachment was slightly lower for coatings with % APT-PDMS greater than or equal to 10%. In general, *N. incerta* removal at 20 psi was significantly higher than 10 psi. % APT-PDMS greater than or equal to 10% facilitated 70-90% removal of *N. incerta*, similar to regular polyurethane coatings. On the other hand, the commercial standards showed only 30-60% removal of *N. incerta* at 20 psi water jet pressure. Diatoms tend to attach strongly onto hydrophobic PDMS rich surfaces, which is evident from FIG. 7(a). See Holland et al., *Biofouling* 2004, 20(6), 323-329. But, changing environment (air to water) may have resulted in rearrangement of the chains, resulting in increase in hydrophilicity of the coatings. This rearrangement of chains at higher APT-PDMS content may have facilitated higher removal of *N. incerta* from the surface of select PACM_1:1_Fx coatings.

Figure 8A:
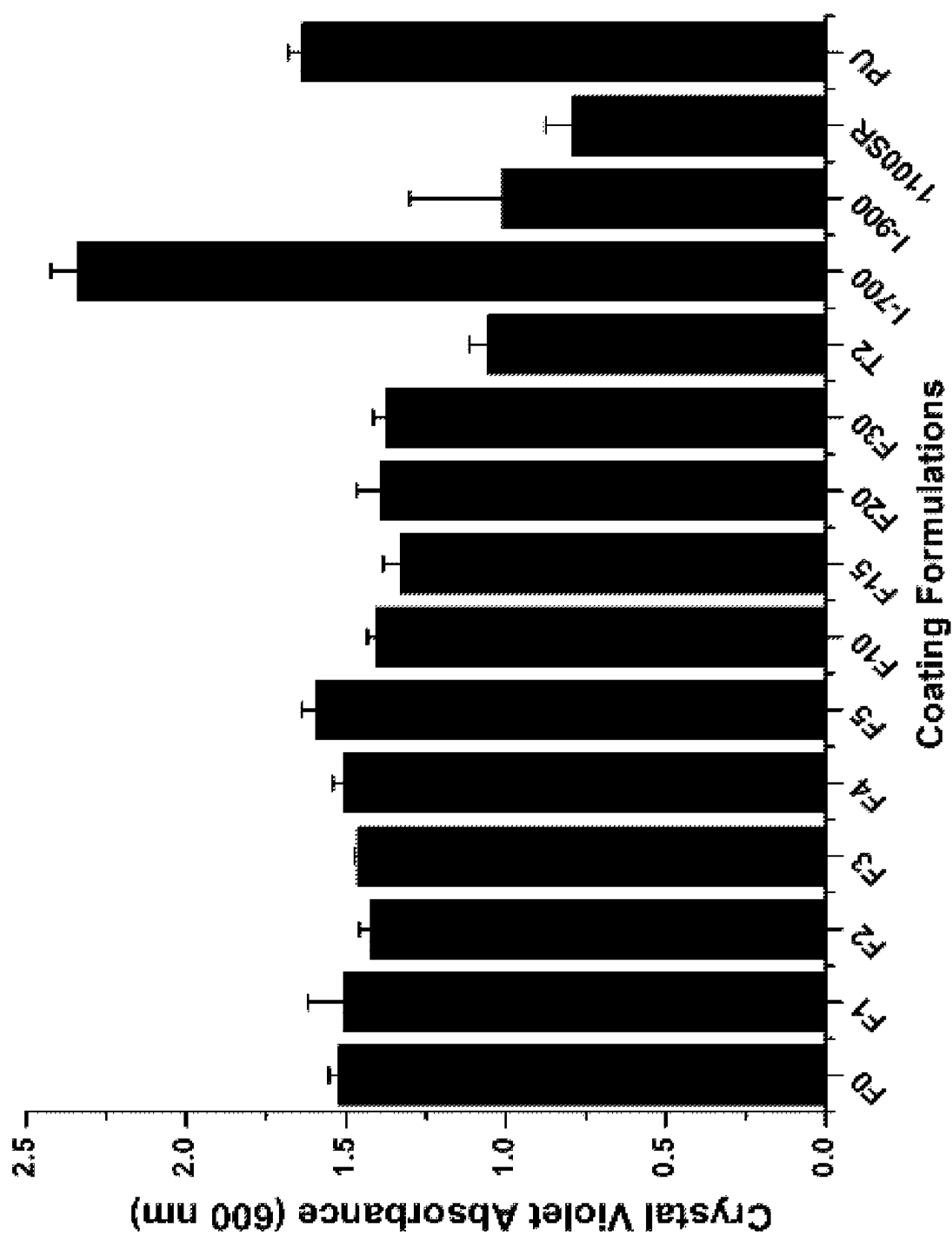
FIG. 8(a) shows the results for bacterial biofilm *C. lytica* attachment for PACM_1:1_Fx coatings of the invention. Coating labels are of the format F % APT-PDMS.
Figure 8B:
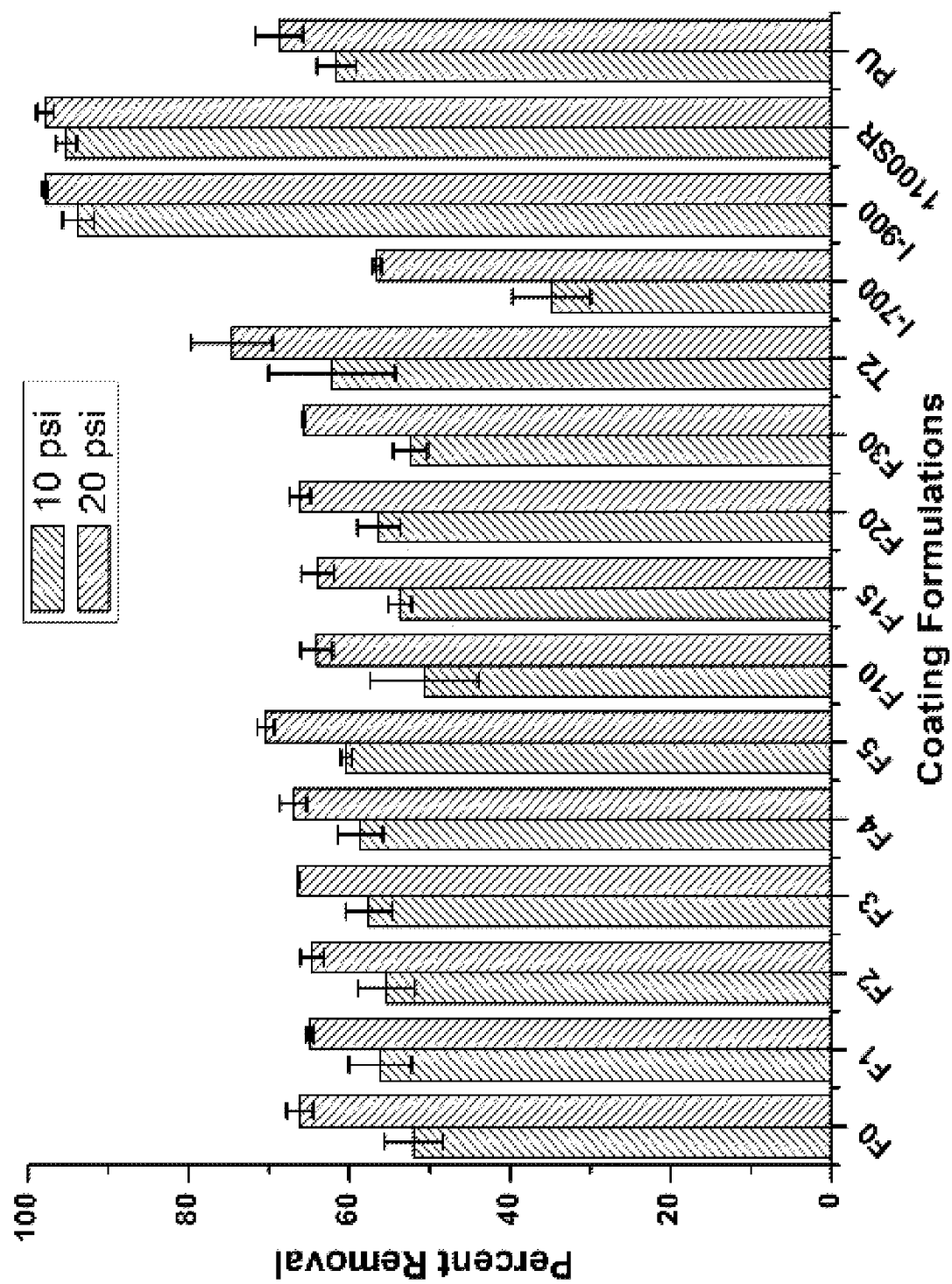
FIG. 8(b) shows the results for bacterial biofilm *C. lytica* removal at 10 psi and 20 psi water jet pressures from PACM_1:1_Fx coatings of the invention. Coating labels are of the format F % APT-PDMS.

FIGS. 8(a) and 8(b) show the results for bacterial biofilm *C. lytica* attachment and removal from PACM_1:1_Fx coatings. From FIG. 8(a), it can be seen that the amount of *C. lytica* attached to PACM_1:1_Fx coatings was lower than Intersleek 700, but higher than Silastic T2, Intersleek 900, and Intersleek 1100SR commercial standards. 20 psi water jet pressure facilitated slightly higher removal of *C. lytica* compared to 10 psi water jet. At 20 psi, 65-70% biofilm was removed from the surface of PACM_1:1_Fx coatings, similar to regular polyurethane coatings. Among the commercial standards, Intersleek 900 and Intersleek 1100SR showed about 98% removal of biofilm from the surface, while Intersleek 700 showed only 55% removal.

Figure 9:
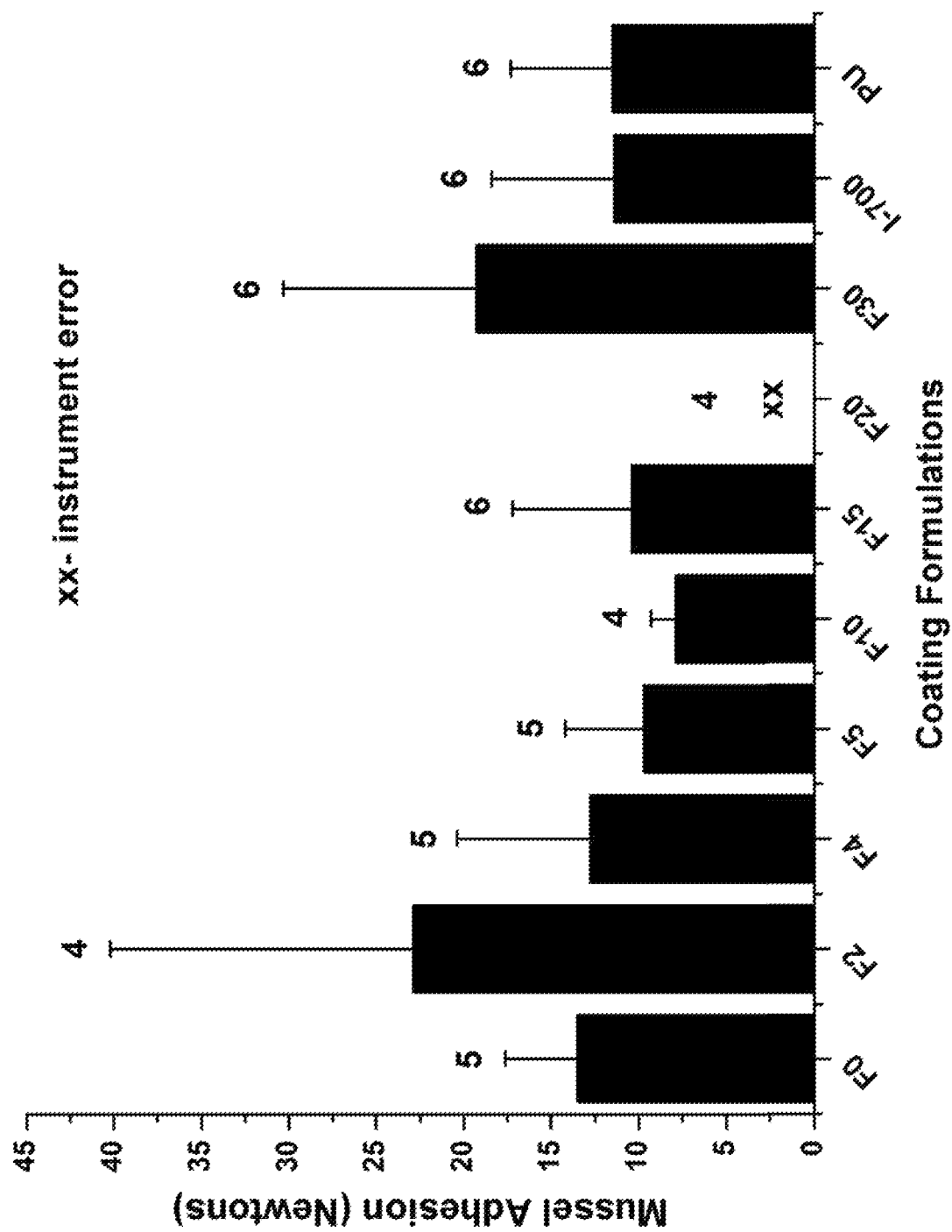
FIG. 9 shows the results for mussel *Geukensia demissa* adhesion for select PACM_1:1_Fx coatings. Numbers above data points indicate the number of mussels out of six that attached to the coatings during experimentation. None of the mussels attached to Intersleek 900 or Intersleek 1100SR coatings. Coating labels are of the format F % APT-PDMS.

FIG. 9 shows the mussel adhesion data for select PACM_1:1_Fx coatings. The numbers above each data points indicate the number of mussels out of six that attached to the coatings during experimentation. 1-2 mussels out of 6 did not attach onto the coatings during the experiment. Formulations PACM_1:1_F5, PACM_1:1_F10, and PACM_1:1_F15 showed mussel adhesion strength slightly lower than Intersleek 700 and polyurethane. Among all the coatings, PACM_1:1_F10 showed the best FR performance against mussels, with about 10 N force of removal for 4 out 6 mussels that attached to the coating. But, the FR performance of PACM_1:1_Fx coatings was sub-par compared to Intersleek 900 and Intersleek 1100SR, which successfully deterred mussel attachment.

Figure 10:
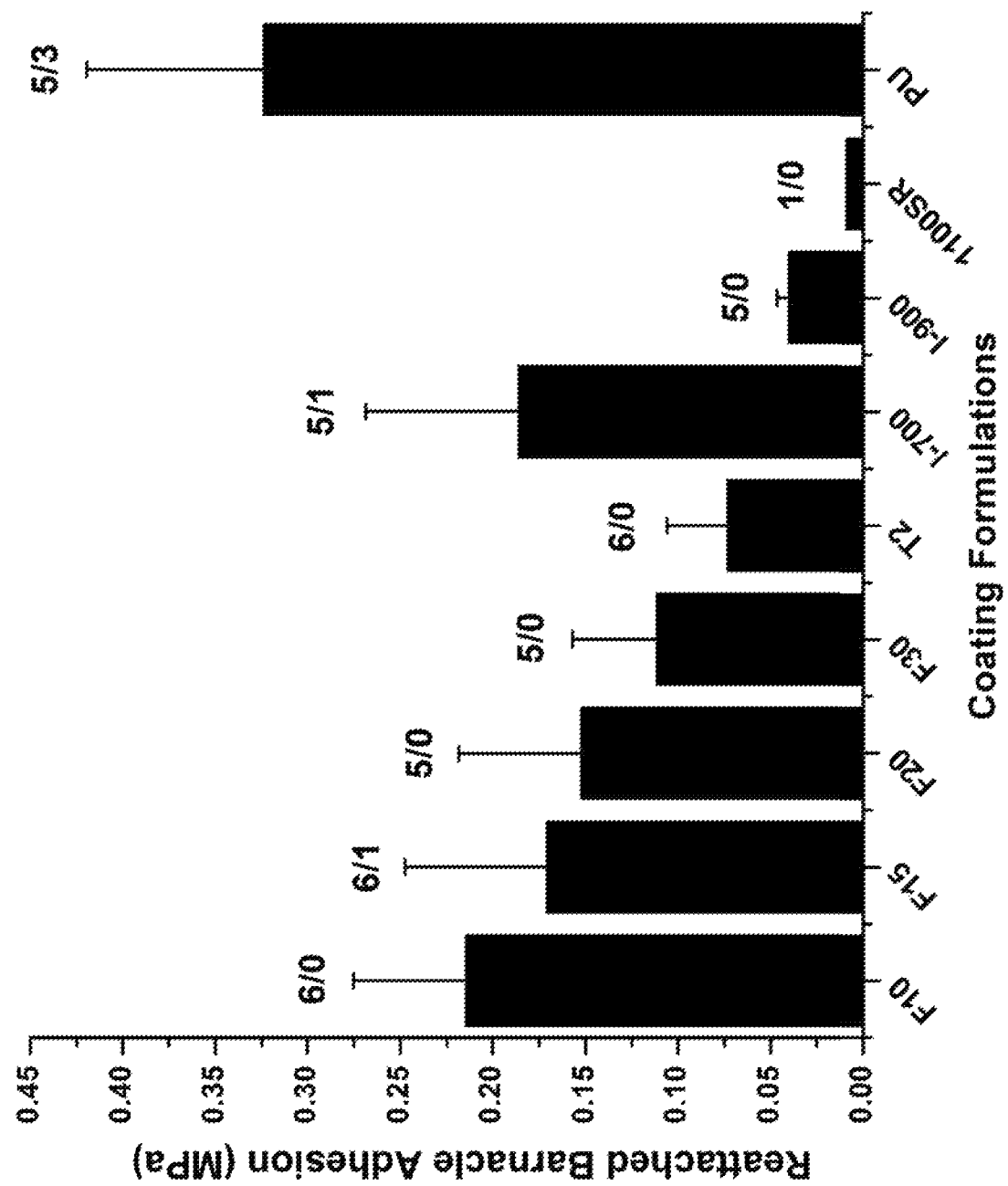
FIG. 10 shows the results for barnacle reattachment data for select PACM_1:1_Fx coatings. Coating labels are of the format F % APT-PDMS.

FIG. 10 shows the results for barnacle attachment for select PACM cured coatings. Ratios above each data point indicate the number of barnacles that attached to the coatings to the number of barnacles that broke during the course of the experiment. In general, the select PACM cured coatings showed higher attachment of barnacles as compared to the commercial Intersleek 900 and Intersleek 1100SR, but required lower removal force as compared to Intersleek 700. Increasing % APT-PDMS resulted in decrease in barnacle attachment strength. Among the select formulations, PACM_1:1_F30 required lowest average force of removal of about 0.12 MPa for 5 (out of 6) barnacles that attached to the coating. Conversely, PACM_1:1_F15 exhibited the poorest FR performance among all IGC_PDMS formulations; all 6 barnacles attached onto the coating, with 1 barnacle breaking during experimentation.

Experimental Conclusions

An isocyanate-free siloxane-modified glycidyl carbamate resin of the invention (IGC_PDMS) was synthesized using HDI trimer, glycidol, and dicarbinol PDMS. One of the biggest challenges involved combining the highly polar GC resin with the non-polar PDMS component to make smooth, uniform coating films. Therefore, a solvent combination of EEP and toluene was used specifically to increase compatibility between the polar and non-polar components in the resin. EEP and toluene were used as solvents to give about 50% solid final resin. Absence of the isocyanate peak as observed using FTIR showed that the isocyanate had completely reacted during the course of the reaction. Moreover, PDMS was used to modify the resin not only to reduce the viscosity of the GC resin, but also as a medium to compatibilize the additional APT-PDMS with IGC_PDMS resin.

Different coating formulations were made using the IGC_PDMS resin and different amine crosslinkers, including PACM, Ancamine 2143, Ancamine 2432, Ancamide 2634, and Ancamide 2767 in varying epoxy:amine hydrogen ratios. Varying amounts of high MW APT-PDMS (20 k g/mol) (Table 1) were added to the formulations to identify formulation(s) that exhibit optimum FR performance. The coatings were subjected to different curing schedules depending on the amine crosslinker used (Table 1). PACM coatings were cured at 80° C. for 45 minutes, while the coatings cured using the polyamines and polyamides were allowed to cure under ambient laboratory conditions for 3 weeks. After curing, all the coatings were tested for their solvent resistance, hardness, and flexibility. MEK double rub test showed that the resin shows potential to be cross-linked under ambient conditions. Epoxy:amine hydrogen ratio of 1:2 resulted in coatings with higher hardness and flexibility amongst all formulations. PACM containing coatings formed uniform surface, probably due to increase in compatibility between phases at higher temperatures. For example, PACM_1:1_Fx coatings exhibited good hardness, flexibility, and possessed a uniform glossy surface. On the other hand, curing the coatings at room temperature resulted in the formation of non-uniform, non-glossy, oily coatings. For example, although Ancamine 2143_1:1_Fx and Ancamine 2432-1:1_Fx coatings exhibited higher hardness, the coatings appeared non-uniform and non-glossy. This difference in appearance of the two sets of coatings may be attributed to the difference in curing conditions.

Based on the results from characterization tests combined with appearance of coatings, PACM-cured and Ancamine 2432-cured coatings were selected for further analysis. From DSC, $T_g$ values of coatings with PACM were higher than Ancamine 2432 cured coatings. TGA showed similar degradation temperatures for PACM-cured and Ancamine 2432-cured coatings. Higher initial weight loss with coatings cured using Ancamine 2432 may be due to the presence of solvents in the coating film. In case of PACM cured coatings, most of the solvent may have volatilized during oven-curing at 80° C. Elevated temperature for the PACM cured coatings may have caused better compatibility among the components, resulting in a uniform coating film.

Measurement of contact angle showed that PACM_1:1_F30 coating showed highest WCA value of 118° and lowest SE value of 10.5 mN/m among all coating formulations. With Ancamine 2432, highest WCA of 110° was observed. One probable reason for the lower WCA value with Ancamine 2432 may be formation of a loose coating network as compared to PACM, which disallowed complete separation of the PDMS chains in the formulations. Nevertheless, WCA values greater than 90° for all the coatings indicated stratification of the PDMS component upon curing of the formulations. Prior to experiments with fouling organisms, all coatings were subjected to leachate toxicity test. Extremely toxic nature of 2143_1:1_Fx coatings led to discontinuation of further FR tests with 2143_1:1_Fx coatings.

FR experiments with diatom *N. incerta* and bacterial biofilm *C. lytica* showed higher attachment of both the diatoms and the biofilm onto PACM_1:1_Fx coatings compared to the commercial standards, Intersleek 900 and Intersleek 1100SR. At 20 psi water jet pressure, only 70% *C. lytica* was removed from the surface of PACM_1:1_Fx coatings, which is significantly lower than ~98% removal from Intersleek 900 and Intersleek 1100SR coatings. On the other hand, APT-PDMS content greater than or equal to 10% facilitated higher removal (70-90%) of *N. incerta* at 20 psi water jet pressure compared to the commercial standards (30-60% removal). PACM_1:1_Fx coatings also showed higher attachment of macrofoulants like mussels and barnacles in comparison to Intersleek 900 and Intersleek 1100SR coatings. Among all the PACM cured formulations, PACM_1:1_F10 required lowest force of about 10 N for the removal of 4 (out of 6) mussels that attached to the coating. Similarly, PACM_1:1_F30 showed lowest barnacle adhesion strength of about 0.11 MPa for 5 out of 6 barnacles that attached to the coating during experimentation. Overall, while FR performance of the IGC_PDMS coatings was not equivalent to the commercial standards, the results demonstrate that the isocyanate-free siloxane-modified GC coatings of the invention can be successfully used in FR marine applications.

The claimed invention is:

1. A siloxane-modified glycidyl carbamate resin, comprising the reaction product of at least one organic polyisocyanate, glycidol, and at least one bis(hydroxyl alkyl)-terminated polydimethylsiloxane.

2. The siloxane-modified glycidyl carbamate resin of claim 1, wherein the at least one organic polyisocyanate is selected from the group consisting of aliphatic, cycloaliphatic, araliphatic, aromatic polyisocyanate, and mixtures thereof.

3. The siloxane-modified glycidyl carbamate resin of claim 1, wherein the at least one organic polyisocyanate is selected from the group consisting of:

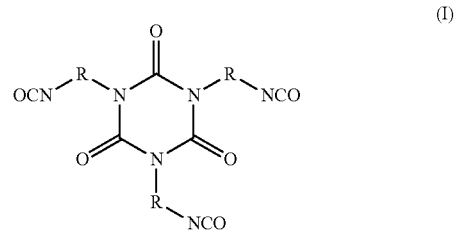

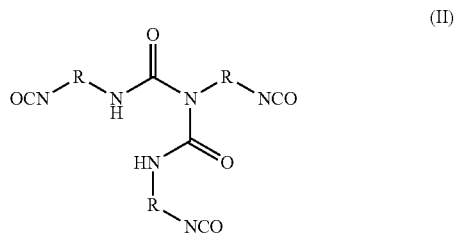

wherein R is independently an optionally substituted, divalent $C_1$-$C_{15}$ alkyl, an optionally substituted $C_3$-$C_{15}$ cycloalkyl, or a group selected from:

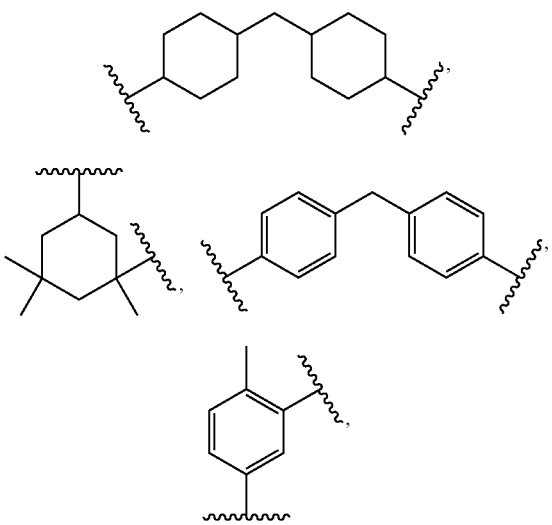

-continued

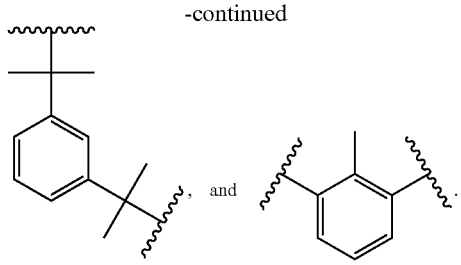

4. The siloxane-modified glycidyl carbamate resin of claim 3, wherein R is a $C_2$-$C_{10}$ straight chain or branched alkyl.

5. The siloxane-modified glycidyl carbamate resin of claim 1, wherein the at least one bis(hydroxyl alkyl)-terminated polydimethylsiloxane has the following structure of formula (III):

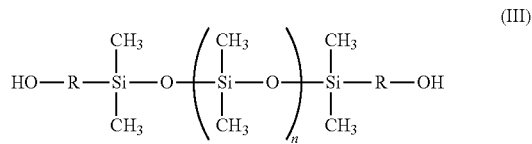

wherein R is a $C_3$-$C_{12}$ straight chain alkyl or an alkylene ether;

wherein n ranges from 0 to about 680.

6. The siloxane-modified glycidyl carbamate resin of claim 5, wherein the at least one bis(hydroxyl alkyl)-terminated polydimethylsiloxane is selected from a dicarbinol polydimethylsiloxane having the following structure of formula (IV):

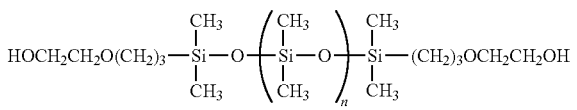

wherein n ranges from 0 to about 680.

7. The siloxane-modified glycidyl carbamate resin of claim 6, wherein the at least one dicarbinol polydimethylsiloxane has a molecular weight ranging from about 400 to about 50,000 Dalton.

8. The siloxane-modified glycidyl carbamate resin of claim 7, wherein the at least one dicarbinol polydimethylsiloxane has a molecular weight of about 5,000 Dalton.

9. The siloxane-modified glycidyl carbamate resin of claim 1, wherein the at least one bis(hydroxyl alkyl)-terminated polydimethylsiloxane is reacted with the at least one organic polyisocyanate in an amount ranging from about 0.5% to about 20% equivalents to the isocyanate groups in the at least one organic polyisocyanate.

10. The siloxane-modified glycidyl carbamate resin of claim 1, wherein the ratio of stoichiometric equivalents of isocyanate:polydimethylsiloxane hydroxyl groups+glycidol is 1:1.

11. The siloxane-modified glycidyl carbamate resin of claim 1, further comprising at least one solvent.

12. The siloxane-modified glycidyl carbamate resin of claim 1, further comprising at least one catalyst.

13. A coating composition comprising:
    a) at least one siloxane-modified glycidyl carbamate resin of claim 1, and
    b.

14. The coating composition of claim 13, wherein the ratio of epoxy to amine hydrogen equivalent weight ranges from 1:1 to 1:2.

15. The coating composition of claim 13, wherein said at least one curing agent is selected from at least one amine crosslinker.

16. A method for making the siloxane-modified glycidyl carbamate resin of claim 1 comprising:
    a) reacting the at least one organic polyisocyanate;
    b) the glycidol; and
    c) the at least one bis(hydroxyl alkyl)-terminated polydimethylsiloxane.

17. A method for making a coating composition, comprising curing at least one siloxane-modified glycidyl carbamate resin of claim 1 with at least one curing agent.

18. A fouling-release coating system comprising at least one siloxane-modified glycidyl carbamate resin of claim 1 and at least one curing agent.

19. A method for applying a fouling-release coating system of claim 18 on at least a part of the surface of a substrate.

20. An article coated with a coating composition of claim 13.

* * * * *

UNITED STATES PATENT AND TRADEMARK OFFICE
CERTIFICATE OF CORRECTION

PATENT NO. : 10,759,950 B2
APPLICATION NO. : 16/076395
DATED : September 1, 2020
INVENTOR(S) : Dean C. Webster et al.

Page 1 of 1

It is certified that error appears in the above-identified patent and that said Letters Patent is hereby corrected as shown below:

In the Claims

Column 30, Claim 13, replace:
"13. A coating composition comprising:
a) at least one siloxane-modified glycidyl carbamate resin of claim 1, and
b)"

With:
--13. A coating composition comprising:
a) at least one siloxane-modified glycidyl carbamate resin of claim 1, and
b) at least one curing agent.--

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*